(12) United States Patent
Barton et al.

(10) Patent No.: US 9,032,993 B2
(45) Date of Patent: May 19, 2015

(54) HANDLE MECHANISM FOR AN HVAC DAMPER ACTUATOR

(75) Inventors: Eric Barton, Eden Prairie, MN (US); David James Emmons, Plymouth, MN (US); Pavel Marak, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 279 days.

(21) Appl. No.: 13/523,706

(22) Filed: Jun. 14, 2012

(65) Prior Publication Data

US 2013/0333502 A1    Dec. 19, 2013

(51) Int. Cl.
| | |
|---|---|
| *F16K 15/00* | (2006.01) |
| *F24F 13/10* | (2006.01) |
| *F24F 13/14* | (2006.01) |
| *F16K 1/20* | (2006.01) |
| *F16K 31/52* | (2006.01) |
| *F16K 31/53* | (2006.01) |
| *F16K 15/03* | (2006.01) |
| *F16K 15/06* | (2006.01) |
| *F16K 37/00* | (2006.01) |

(Continued)

(52) U.S. Cl.
CPC ............... *F24F 13/10* (2013.01); *F16K 15/033* (2013.01); *F16K 15/063* (2013.01); *F16K 37/0016* (2013.01); *F16K 31/602* (2013.01); *G05G 1/087* (2013.01); *F24F 13/1426* (2013.01); *F16K 1/2014* (2013.01); *F16K 31/521* (2013.01); *F16K 31/535* (2013.01); *F16K 1/2007* (2013.01)

(58) Field of Classification Search
CPC ..... F16K 15/033; F16K 15/063; F16K 17/06; F16K 31/53; F16K 31/602; F16K 37/0016
USPC ........ 137/524, 527, 527.4, 527.6, 527.8, 554; 251/83, 235, 248, 250.5, 305, 95, 96, 251/98, 99, 100; 242/395.1; 192/20
See application file for complete search history.

(56) References Cited

U.S. PATENT DOCUMENTS

| | | | | |
|---|---|---|---|---|
| 940,182 | A | * | 11/1909 | Webster ........................ 137/527 |
| 1,613,322 | A | * | 1/1927 | Goetz ........................... 181/254 |

(Continued)

FOREIGN PATENT DOCUMENTS

| | | |
|---|---|---|
| CN | 101424504 | 10/2007 |
| EP | 0612950 | 8/1994 |

(Continued)

OTHER PUBLICATIONS

U.S. Appl. No. 29/477,001, filed Dec. 27, 2013.

(Continued)

*Primary Examiner* — Matthew W Jellett
(74) *Attorney, Agent, or Firm* — Seager, Tufte & Wickhem LLC

(57) ABSTRACT

A damper system may include a handle mechanism for use with a damper actuator system. Illustratively, the handle mechanism may include a drive gear mechanism, a handle, a housing, and a spring, and may be actuated to set a crack pressure for the damper system. The handle may connect to the drive gear mechanism at a drive gear arm of the drive gear mechanism and may flip over or about the drive gear arm to move from a first position to a second position. In some instances, once the handle is in the second position, a force may be applied thereto to disengage the drive gear from a stop member and thereafter, the handle may be rotated to change the crack pressure of the damper system.

17 Claims, 18 Drawing Sheets

(51) Int. Cl.
*F16K 31/60* (2006.01)
*G05G 1/08* (2006.01)

(56) References Cited

U.S. PATENT DOCUMENTS

| | | | |
|---|---|---|---|
| 1,710,515 A * | 4/1929 | Roman | 251/96 |
| 2,327,980 A * | 8/1943 | Bryant | 192/48.9 |
| 2,465,162 A | 3/1949 | Lockwood | |
| 2,745,360 A * | 5/1956 | Lunde | 105/307 |
| 3,143,137 A | 8/1964 | Muller | |
| 3,276,480 A | 10/1966 | Kennedy | |
| 3,279,744 A * | 10/1966 | Fieldsen et al. | 251/129.03 |
| 3,521,659 A * | 7/1970 | Seger | 137/112 |
| 3,817,452 A | 6/1974 | Dean | |
| 3,847,210 A * | 11/1974 | Wells | 165/103 |
| 4,088,150 A * | 5/1978 | Serratto | 137/499 |
| 4,137,945 A * | 2/1979 | Cutts | 137/625.46 |
| 4,272,036 A * | 6/1981 | Watermann | 242/394 |
| D267,335 S | 12/1982 | Axel et al. | |
| 4,487,363 A | 12/1984 | Parker et al. | |
| 4,534,538 A | 8/1985 | Buckley et al. | |
| 4,549,446 A | 10/1985 | Beeson | |
| D286,907 S | 11/1986 | Hilpert et al. | |
| 4,671,540 A | 6/1987 | Medvick et al. | |
| 4,732,318 A | 3/1988 | Osheroff | |
| D295,280 S | 4/1988 | Waiser | |
| 4,829,447 A | 5/1989 | Parker et al. | |
| 4,836,497 A | 6/1989 | Beeson | |
| 4,841,733 A | 6/1989 | Dussault et al. | |
| 5,133,265 A | 7/1992 | Lahti et al. | |
| 5,249,596 A | 10/1993 | Hickenlooper, III et al. | |
| D359,103 S | 6/1995 | Bouc et al. | |
| 5,518,462 A | 5/1996 | Yach | |
| 5,551,477 A | 9/1996 | Kanno et al. | |
| 5,564,461 A | 10/1996 | Raymond, Jr. et al. | |
| 5,588,682 A | 12/1996 | Breese | |
| 5,634,486 A | 6/1997 | Hatting et al. | |
| 5,806,555 A | 9/1998 | Magno, Jr. | |
| 5,819,791 A * | 10/1998 | Chronister et al. | 137/512.1 |
| 5,944,224 A | 8/1999 | Hodge et al. | |
| 5,954,088 A | 9/1999 | Huang | |
| 6,073,907 A | 6/2000 | Schreiner, Jr. et al. | |
| D480,450 S | 10/2003 | Saadi et al. | |
| 6,742,765 B2 | 6/2004 | Takano et al. | |
| D498,821 S | 11/2004 | Nortier | |
| 6,880,806 B2 | 4/2005 | Haikawa et al. | |
| 7,024,527 B1 | 4/2006 | Ohr | |
| 7,048,251 B2 | 5/2006 | Schreiner | |
| 7,055,795 B2 * | 6/2006 | Lay | 251/129.03 |
| 7,131,635 B2 | 11/2006 | Oh | |
| 7,188,481 B2 | 3/2007 | DeYoe et al. | |
| D543,003 S | 5/2007 | Helmetsie | |
| 7,260,899 B2 | 8/2007 | Jones | |
| D552,643 S | 10/2007 | Bonomi | |
| D571,290 S | 6/2008 | Gebhart et al. | |
| 7,395,718 B2 | 7/2008 | Obermeier | |
| 7,428,626 B2 | 9/2008 | Vega | |
| D587,211 S | 2/2009 | Greenslade | |
| D600,319 S | 9/2009 | Downing | |
| 7,600,327 B2 | 10/2009 | Sharp | |
| 7,631,155 B1 | 12/2009 | Bono et al. | |
| 7,640,677 B2 | 1/2010 | Vock et al. | |
| D610,655 S | 2/2010 | Schmidt | |
| D614,150 S | 4/2010 | Crites | |
| D616,067 S | 5/2010 | Cavagna | |
| 7,708,254 B2 | 5/2010 | Hertzog | |
| D621,909 S | 8/2010 | Parsons et al. | |
| 7,769,861 B2 | 8/2010 | Bendich et al. | |
| 7,805,564 B2 | 9/2010 | Matsunami et al. | |
| D629,069 S | 12/2010 | Parsons et al. | |
| D629,871 S | 12/2010 | Marinoni et al. | |
| D631,944 S | 2/2011 | Karmel et al. | |
| D634,813 S | 3/2011 | Hernandez, IV | |
| 7,914,872 B2 | 3/2011 | Leonard et al. | |
| 7,937,527 B2 | 5/2011 | Matsunami et al. | |
| 8,051,244 B2 | 11/2011 | Matsunami et al. | |
| D650,337 S | 12/2011 | Bonomi | |
| 8,083,205 B2 | 12/2011 | Sneh | |
| D654,523 S | 2/2012 | Iranyi et al. | |
| 8,122,911 B2 * | 2/2012 | Wark | 138/45 |
| 8,341,350 B2 | 12/2012 | Jess et al. | |
| D675,714 S | 2/2013 | Nguyen | |
| 8,386,708 B2 | 2/2013 | Jess | |
| D680,141 S | 4/2013 | Sannomiya | |
| D686,297 S | 7/2013 | Laugen et al. | |
| D687,070 S | 7/2013 | Liao | |
| D691,703 S | 10/2013 | Iranyi et al. | |
| 2004/0099833 A1 | 5/2004 | Haikawa et al. | |
| 2004/0129909 A1 * | 7/2004 | Wiese | 251/129.04 |
| 2008/0116288 A1 * | 5/2008 | Takach et al. | 236/49.5 |
| 2012/0325338 A1 | 12/2012 | Pettinaroli et al. | |
| 2013/0054932 A1 | 2/2013 | Acharya et al. | |
| 2013/0187073 A1 | 7/2013 | Carlson et al. | |

FOREIGN PATENT DOCUMENTS

| | | |
|---|---|---|
| EP | 1235128 | 8/2002 |
| EP | 1672261 | 6/2006 |
| EP | 1701108 | 9/2006 |
| EP | 1967777 | 9/2008 |
| EP | 2088529 | 8/2009 |
| GB | 2468292 | 6/2012 |
| JP | 2007108106 | 4/2007 |
| WO | WO 2010/100403 | 2/2010 |
| WO | WO 2011/043663 | 4/2011 |
| WO | WO 2011/066328 | 6/2011 |

OTHER PUBLICATIONS

Electric Actuator MOD.VB015 "Maintenance and Instillation Instructions of Valbia Electric Actuators" Sections 1.0-8.0 6 pages, downloaded Dec. 18, 2013.
HVAC Actuator Google Image Search Results: "https://www.google.com/search?q=damper+actuator&tbm=ish&source= . . ." 12 pages, Dec. 18, 2013.
Valbia Electric Actuators, Bonomi USA, Inc. General Specifications, N.105, 4 pages, downloaded Dec. 18, 2013.
Smart-T and MT-Adapt-HW Mounting Adapter, 1 page, prior to Feb. 23, 2011.
CHROMalytic Technology, "Actuators and Accessories; Air Actuators," Australian Distributors; Importers & Manufacturers, pp. 194-211, Downloaded Feb. 2012.
U.S. Appl. No. 13/032,856, filed Feb. 23, 2011.
U.S. Appl. No. 29/408,681, filed Dec. 15, 2011.
U.S. Appl. No. 13/358,453, filed Jan. 25, 2012.
U.S. Appl. No. 13/523,724, filed Jun. 14, 2012.
U.S. Appl. No. 13/523,742, filed Jun. 14, 2012.
U.S. Appl. No. 13/523,754, filed Jun. 14, 2012.
Search Report for Corresponding Application No. 12156608.7-2422 Dated Jun. 1, 2012.
Honeywell, "Dampers Actuators and Valves," Application and Selection Guide, 295 pages, Jan. 2011.
Honeywell, "Excel 10 W7751H3007 VAV Actuators," Installation Instructions, 10 pages, 2007.
Honeywell, "M5410 C1001/L1001 Small On/Off Linear Valve Actuators," Product Data, 4 pages, 2010.
Honeywell, "M6061 Rotary Valve Actuators," Product Data, 6 pages, 2011.
Honeywell, "ML6420A30xx/ML7420A60xx," Electric Linear Valve Actuators, Installation Instructions, 2 pages, 2010.
VICI Valco Instruments Co. Inc., "Multiposition Microelective Valve Actuators Models EMH, EMT, ECMH, and ECMT," VICI AG International, 9 pages, Downloaded Feb. 2012. TN-415 Dec. 2007.
Honeywell, "ML6435B/ML7435E Electric Linear Actuators for Floating/Modulating Control," Installation Instructions, 2 pages, 2008.
Honeywell, "MT4-024/MT4-230 MT8-024/MT8-230, Small Linear Thermoelectric Actuators," Product Data, 5 pages, 2009.
Honeywell, "MT-Clip—Mounting Clips for MT4/MT8," Mounting Instructions, 1 page, prior to Feb. 23, 2011.

(56) References Cited

OTHER PUBLICATIONS

Honeywell, "MT-Clip-ATP—Mounting Clips for MT4/MT8," 2 pages, 2006.
Honeywell, "N20xx/N34xx Non-spring Return Direct-Coupled Damper Actuators," Wiring, 4 pages, 2012.
Honeywell, "Small Linear Thermoelectric Actuator, MT4-024/MT4-230/MT8-024/MT8-230," Mounting Instructions, 2 pages, 2006.
Honeywell, "Small Linear Thermoelectric Actuator, MT4-024/MT4-230/MT8-024/MT8-230," Mounting Instructions, 2 pages, 2007.
Honeywell, "VC2, VC4, VC60, VC8 On-Off Actuator for VC Series Balanced Hydronic Valves,".
Installation Instructions, 8 pages, 2011.
Honeywell, M5003A, 2 pages, Sep. 2010.
Honeywell, M6410C/L M7410C, 2 pages, prior to Feb. 23, 2011.
Honeywell, M7061 Installation Instructions, 2 pages, 2003.
Honeywell, "VC6800, VC6900 Series Floating Control Valves," Product Data, 6 pages, Nov. 1996.

* cited by examiner

HANDLE MECHANISM FOR AN HVAC DAMPER ACTUATOR

TECHNICAL FIELD

This disclosure generally relates to HVAC damper actuators, and more particularly, to a handle mechanism for use with an HVAC damper actuator.

BACKGROUND

Heating, ventilation and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. The HVAC components can include, for example, a furnace and an air conditioner.

In forced air systems, the conditioned air is typically provided by a furnace and/or air conditioner through a plenum to a network of supply air ducts that distribute the conditioned air throughout the building. A network of return air ducts is often used to return air from the building back to the furnace and/or air conditioner. A blower is used to draw the return air through the return air ducts, and drive the return air through the furnace and/or air conditioner and into the supply air ducts via the plenum. In some cases, some of the air is replaced over time with fresh outside air, often through an energy recovery ventilator.

In a zoned system, conditioned air is delivered to each zone based on the heat load in that zone. Damper actuators are typically placed in the supply air ducts that feed each zone. By activating the damper actuators, the conditioned air may be delivered to only those zones that are calling for conditioned air. When multiple zones are serviced by a common blower, the pressure in the supply air duct can change dramatically depending on how many zones are calling for conditioned air. For example, if all of the zones are calling for conditioned air, the pressure in the supply ducts that are open may be lower than if only a single zone is calling for conditioned air. In some cases, a bypass damper may be placed between in a bypass duct that extends between the supply duct (or the plenum) and the return air duct. This may allow some of the supply air to pass directly to the return air duct when the pressure in the plenum rises above a threshold value, such as when only a small number of zones are calling for conditioned air. Because the bypass damper may reduce the overall energy efficiency of the HVAC system, it is desirable for the bypass damper to only be opened when necessary (e.g. to help protect the HVAC equipment).

SUMMARY

This disclosure generally relates to HVAC damper actuators, and more particularly, to a handle mechanism for use with an HVAC damper actuator. In one example, an HVAC damper actuator may include a damper blade, a shaft in communication with the damper blade, and a driven gear in communication with the shaft. In some cases, a handle mechanism may include a drive gear mechanism in communication with the driven gear, a handle, a housing, and a spring. Illustratively, the handle may be actuated to rotate the drive gear mechanism and drive the driven gear.

In some instances, the housing may at least partially enclose the drive gear mechanism and the spring, where the spring may be configured to bias the drive gear mechanism toward a first axial position (e.g., a locked position) relative to the housing. Illustratively, a first end of the spring may be adjacent the drive gear and a second end of the spring may be adjacent an interior surface of the top of the housing to bias the drive gear mechanism in the first axial position.

In some cases, the handle may be configured to move the drive gear mechanism against the bias of the spring to a second axial position (e.g., an unlocked position). In some cases, the handle having a first surface and a second surface may be connected to a drive gear arm of the drive gear mechanism such that the handle may be configured to flip over or about the drive gear arm from a first position (e.g., closed position) to a second position (e.g., opened position). Once the handle is in the second position, a force may be applied to the first surface thereof and the second surface of the handle may abut and pivot about the housing to move the drive gear mechanism against the bias of the spring and to the second axial position. After the drive gear mechanism has been positioned in the second axial position, the handle may be rotated to drive the driven gear.

In operation, the handle may be flipped from the first position to the second position and when the handle is in the second position, a force may be applied to the first surface thereof to disengage the drive gear mechanism from a stop member extending from the interior surface of the bottom of the housing. In some cases, once the drive gear mechanism has been disengaged, the handle may be rotated to set the crack pressure in a bypass duct of the damper system. After the crack pressure has been set, the force on the first surface of the handle may be removed to allow the drive gear mechanism to engage the stop member. The handle may then be flipped over or about the drive gear arm from the second position to the first position to further lock-in the set crack pressure.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various embodiments in connection with the accompanying drawings, in which.

Figure 1:
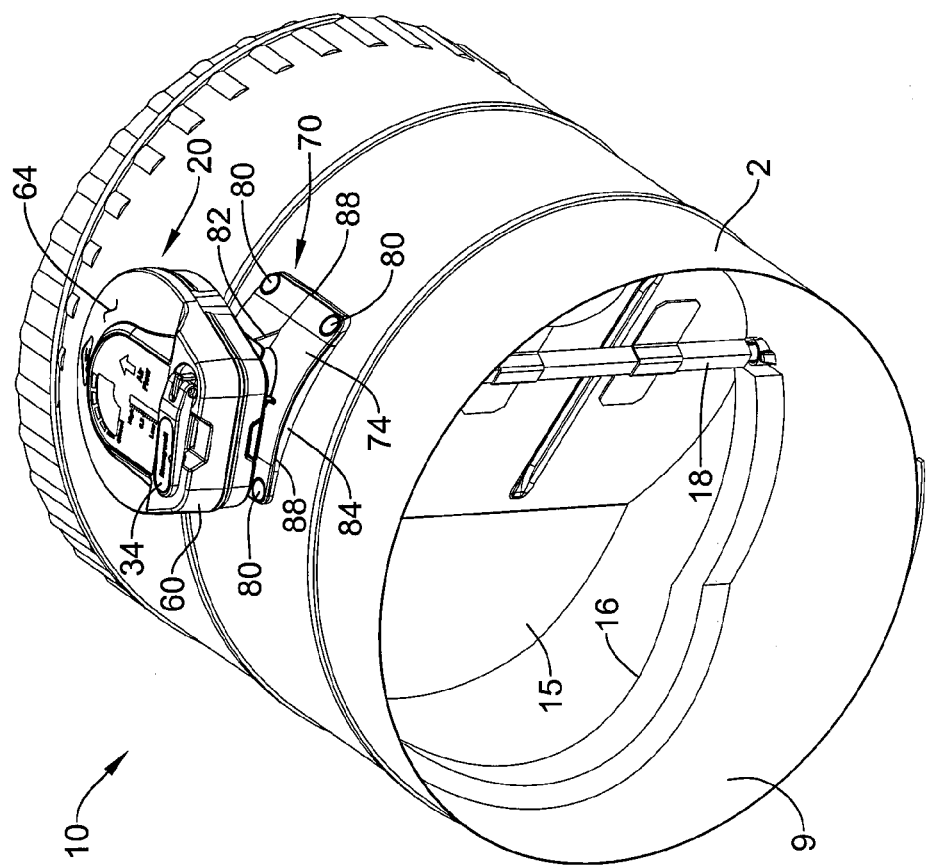
FIG. 1 is a schematic perspective view of an illustrative damper system and a duct section.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative of the claimed disclosure.

For convenience, the present disclosure may be described using relative terms including, for example, left, right, top, bottom, front, back, upper, lower, up, and down, as well as others. It is to be understood that these terms are merely used for illustrative purposes and are not meant to be limiting in any manner.

Forced air zoning systems may be used to enable better temperature control in homes and/or buildings by breaking the control and conditioning into small zones. By doing this, the home or building owner cannot only achieve better temperature control, but also realize energy savings by setting unoccupied areas of their home to more energy efficient set points. When the zoning system is calling to condition only one or a small number of zones, static pressure can rise in the discharge air plenum of the HVAC system. This static pressure rise can often be mitigated or avoided with multi-stage or variable speed forced air equipment. In many cases, however, forced air equipment in homes or buildings is single stage, which does not usually, by itself, allow for static pressure rise control or the equipment is multi-stage but cannot fully compensate for the static pressure rise. In at least these cases, undesirable increased static pressure can occur that may or may not exceed the rated static pressure of the equipment, where the increased static pressure may cause noise in the ducts and/or noise at the discharge registers of the zoned forced air system. One solution may be to include a bypass damper in the forced air equipment. A bypass damper may assist in reducing the rise in static pressure by opening in response to a rise in static pressure reaching a threshold level and "bypassing" air from the discharge plenum to the supply plenum and/or to any other desired plenum or duct.

Figure 2:
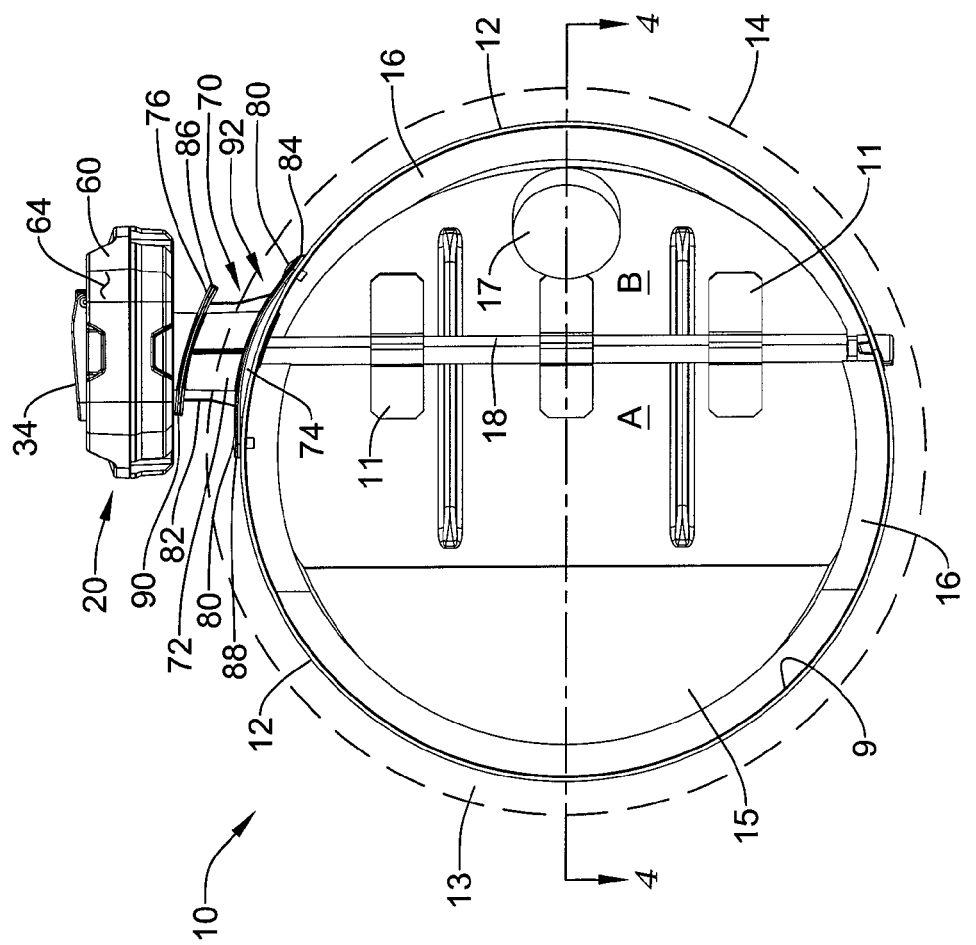
FIG. 2 is a schematic front view of the illustrative damper system and duct section of FIG. 1, with insulation material represented by a dotted line.
Figure 3:
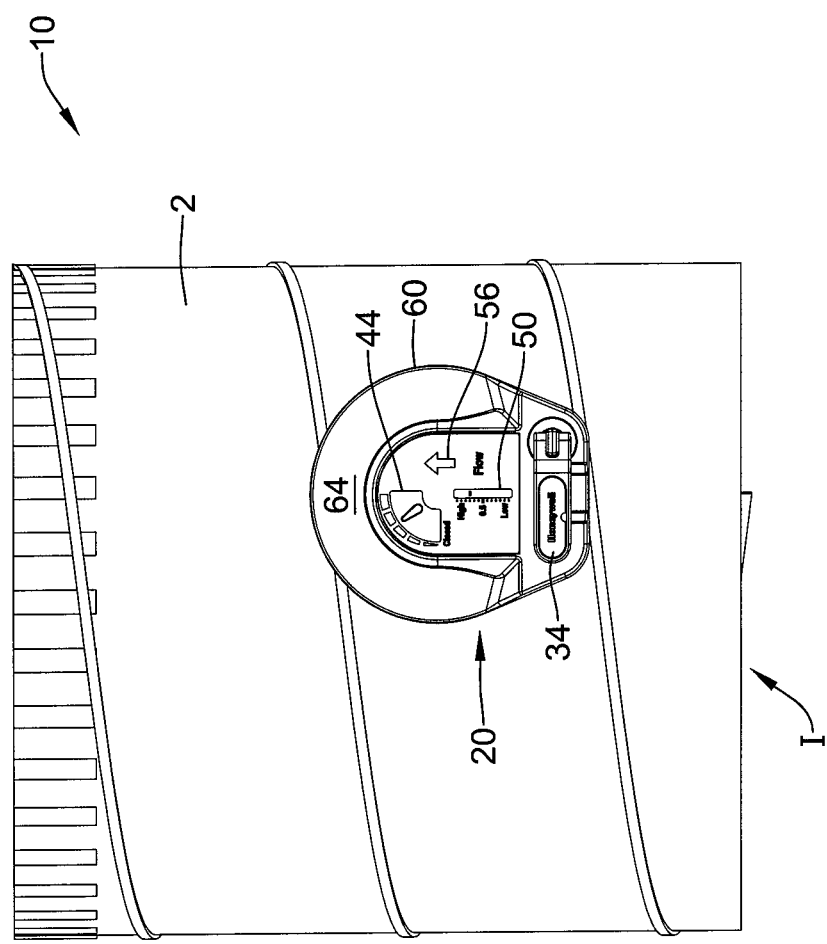
FIG. 3 is a schematic top view of the illustrative damper system and duct section of FIG. 1.

FIGS. 1-3 show views of a damper system 10 integrated with or including a duct 2 that may be used with, for example, single stage forced air equipment and/or other equipment. In some cases, the damper system 10 may be used to limit the rise in the static pressure when a low percentage of zones in a zone system are calling for air through: facilitating re-circulation of excess air from a supply plenum to a return plenum or other plenum or duct of the forced air HVAC system; providing access to a pressure relief dump zone and dumping excess air into a closet, hallway, or other high load and large zone area; dumping excess air into closed zones (e.g., zones not calling for conditioned air) downstream of the zone control dampers; or through any other technique as desired.

In some cases, the damper system 10 may be integrated in a duct 2 of a forced air equipment system and may include a damper actuator 20, an optional standoff 70, a damper or damper blade 15, a damper shaft 18 and a damper stop 16. In an illustrative set up, the damper actuator 20 may be connected to the standoff 70 and the standoff 70 may be connected to duct 2 with one or more fasteners 80 (e.g., screws, rivets, adhesive, solder, weld, etc.), as seen in FIG. 1, and/or through any other connection technique (e.g., any mechanical, electrical, or other connection technique). Illustratively, the damper shaft 18 may extend from the damper actuator 20 through standoff 70, duct 2, one or more damper clamps 11 attached to damper blade 15 and to a shaft receiving area adjacent the other side of duct 2. Alternatively, or in addition, one or more damper shafts 18 may extend any portion of the distance or space from damper actuator 20 to the shaft receiving area adjacent the other side of duct 2, as desired.

In some instances, damper shaft 18 may engage the damper or damper blade 15 and damper clamps 11 at a position offset from a center axis of the damper blade 15, as shown in FIG. 2. In some cases, damper blade 15 may include one or more weights 17 placed on or adjacent to or affixed to a surface of the damper blade 15. In situations where damper shaft 18 interacts with the damper blade 15 at a position offset from a central diameter axis of the damper blade 15, the one or more weights 17 may be placed on a first or large area portion A of blade 15 or a second or small area portion B of blade 15 (shown in FIG. 2), or both, where a surface area of the first or large portion A of the damper blade 15 may be greater than a surface area of the second or small portion B of the damper blade 15, for example. The offset positioning of the shaft 18 with respect to a center axis of the damper blade 15 along with the positioning of the one or more weights 17 may result in a center of gravity of the damper blade 15 being offset from a center axis of the damper blade 15 and optionally, substantially located at the rotation axis of the damper blade 15.

FIG. 2 is a schematic end view of the damper system 10 connected to an insulated duct 2, where an insulating layer 13 (the outer circumference of which is shown by the dotted line around duct 2) is positioned about or at least partially around the duct 2. In some cases, the insulated duct 2 may include an outer surface 12 of the duct 2, the insulating layer 13 on or abutting the outer surface 12 of the duct 2, and an outer surface 14 of the insulating layer 13, where the outer surface 12 of the duct 2 may be an outer layer of a duct or other object at least partially within the insulating layer 13 and the outer surface 14 of the insulating layer 13 may optionally include the outer surface of any layer added to typical insulating layers 13 or an outer surface of any other material positioned about the duct 2. For example, the outer surface 12 of the duct 2 may include the surface on which the insulating layer 13 is placed and the outer surface 14 of the insulating layer 13 may be a surface adjacent a second flange 76 of the standoff 70.

As discussed in further detail below, the standoff 70 may be configured to allow the duct 2 to be insulated, while providing substantially unobstructed access to a damper control or damper actuator 20. The unobstructed access to a damper actuator 20 connected to a duct 2 having an insulation layer 13 thereon may be facilitated by the standoff 70 providing space for the insulation material 13 between the damper actuator 20 and the duct 2. The standoff 70 may provide for any distance, as desired, between the duct 2 and a bottom surface of the damper actuator 20. For example, the standoff 70 may provide a distance between 0.5 inches and 3 inches between the duct 2 and the bottom surface of the damper actuator 20 in order to facilitate the prevention of sweating (e.g., condensation) on the duct 2 and/or on the damper system 10. In another example, the standoff 70 may provide a distance between one inch and two inches between the duct 2 and the bottom surface of the damper actuator 20 in order to facilitate the prevention of sweating on the duct 2 and/or on the damper system 10.

In some cases of typical damper systems, sweat or condensation may form on the exterior of the duct 2 due, at least in part, to cool fluid (e.g., conditioned air, etc.) within the duct and a warm and/or humid environment exterior the duct. As a result, if an actuator is thermally coupled to the duct (e.g., the duct's interior), the actuator may be cooler (e.g., similar to the interior of the duct) than the dew point of the air in which the actuator resides and moisture may condense thereon. In some instances, the distance provided by the standoff 70 between the duct 2 and the bottom surface of the damper actuator 20 that is configured to facilitate the prevention of sweating (e.g., condensation) may provide space for receiving the insulating layer 13, where the insulating layer may have a known R-value and may be used to isolate a cool interior of the duct 2 and the shaft 18 from the surrounding environment to prevent sweating. Example distances provided by the standoff 70 between the duct 2 and the bottom surface of the damper actuator 20 may include distances configured to facilitate receiving one or more insulating layers having R-values between 6 $ft^2 \cdot °F \cdot h/Btu$ and 8 $ft^2 \cdot °F \cdot h/Btu$, 1 $ft^2 \cdot °F \cdot h/Btu$ and 10 $ft^2 \cdot °F \cdot h/Btu$, 1 $ft^2 \cdot °F \cdot h/Btu$ and 20 $ft^2 \cdot °F \cdot h/Btu$, or other R-values, as desired.

In some cases, standoff 70 may include a first flange 74 and a second flange 76 (e.g., a taping flange) separated, at least partially, by a body 72 to form an open space 92 having one or more ribs 82 extending between the first flange 74 and the body 72 and between the second flange 76 and the body 72 for support. The open space 92 may be used for any purpose. For example, the open space 92 may be used for receiving the insulating layer 13 or for other purposes. The position of the actuator 20 outside of any insulating layer 13 (as seen in FIGS. 1 and 2) may allow for indicators 44, 50, 56 and any indicia depicted on or through housing 60 to be easily viewed and/or read by a user.

FIG. 3 depicts a schematic view of a top of the damper system 10 connected to duct 2. As seen in FIG. 3, one or more indicators 44, 50, 56, along with a handle 34 may be positioned on or adjacent the exterior surface 64 of the housing 60 and/or seen on and/or seen through the exterior surface 64. For example, the exterior surface of the housing 60 may include a handle 34 extending therefrom, one or more of a damper blade position indicator 44, a flow direction indicator 56, a pressure level indicator 50 and/or other similar or dissimilar maneuvering and indicator mechanisms.

Figure 4:
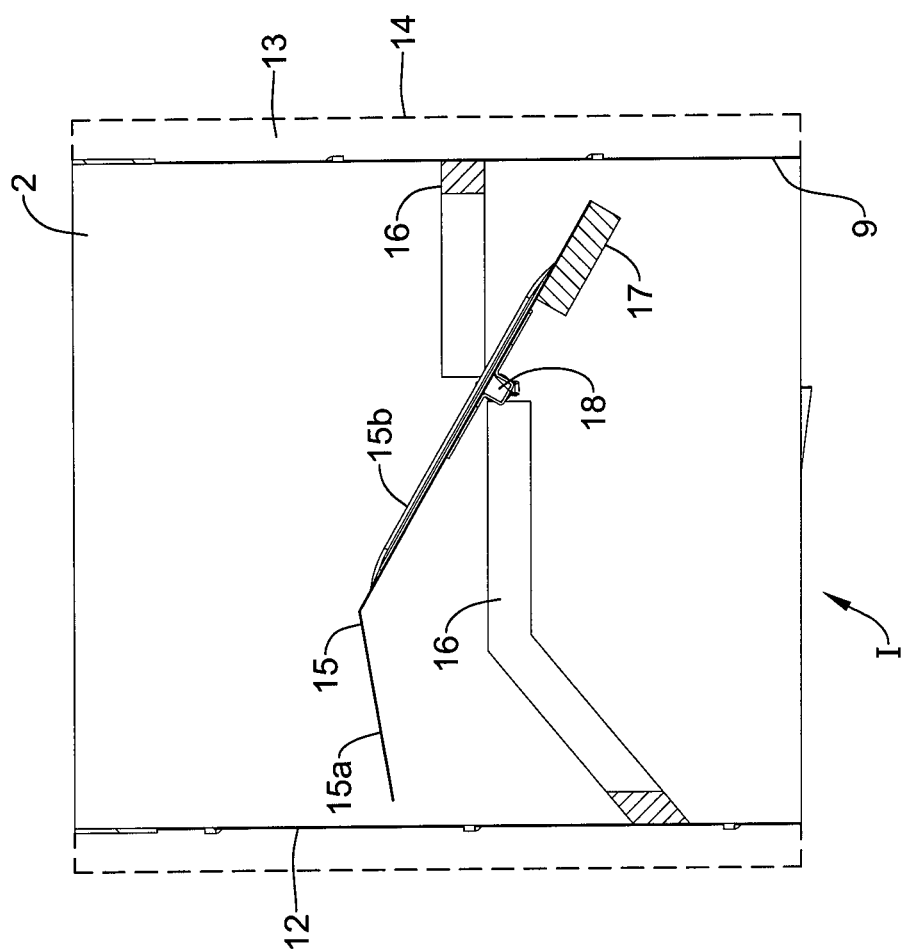
FIG. 4 is a schematic cross-sectional view of the illustrative damper system and duct section taken along line 4-4 of FIG. 2.

FIG. 4 is a schematic cross-sectional view taken along line 4-4 in FIG. 2 of the damper blade 15 within the duct 2, where the damper blade 15 is in an opened position or a second position. Illustratively, the damper blade 15 may be considered to be in the opened position when the damper blade 15 or object configured to rotate with the damper blade 15 is not touching the damper stop 16 or at least a portion of the damper blade 15 or object configured to rotate with the damper blade 15 is not touching the damper stop 16. When the damper blade 15 or object configured to rotate with the damper blade 15 abuts at least a portion of the damper stop 16 and the damper blade 15 forms a seal or a closure within the duct 2 (e.g., substantially blocks a flow through duct 2), the damper blade 15 may be considered to be in a closed position or a first position.

The damper blade 15 may be configured in any dimension or shape and may be made of one or more pieces of material, as desired. For example, the damper blade 15 may be completely straight, may have a bent or angled portion or otherwise may be formed to have an angled portion 15a and a straight portion 15b, or may take on any other shape. In some cases, the angled portion 15a may be bent or formed toward an inlet I of the duct 2 and may be on the first or large portion A of the damper blade 15, or on any other portion of the damper blade 15. The forming of a portion of the damper blade 15 toward the inlet I of the duct 2 may facilitate mitigating pressure rise in the duct 2 by allowing the flow through duct 2 to contact the damper blade 15 in a substantially perpendicular manner as the damper blade 15 opens and/or releases from damper stop 16. In addition, or alternatively, the damper blade 15 may be made of a plurality of pieces of material that at least partially form the portion of the damper blade angled toward the inlet I.

In some cases, the damper stop 16 may be positioned interior the duct 2, as shown in FIG. 4. As shown in FIG. 4, illustratively, the damper blade 15 may be configured to match the shape of the damper stop 16 to create a seal or closure with damper stop 16 within the duct 2. Alternatively, or in addition, the damper stop 16 may be positioned exterior the duct 2 and may be configured to engage any feature or object that rotates with the damper blade 15. For example, the damper blade stop 16 may engage the shaft 18 or a clip or object extending from the shaft 18, as desired.

In some instances, the damper system 10 may include a second damper blade stop (not shown) configured to limit the how far the duct may open from its closed position. The second damper blade stop may be positioned interior the duct 2. Alternatively, or in addition, the second damper stop may be positioned exterior the duct 2 and may be configured to engage any feature or object that rotates with the damper blade 15. For example, the second damper blade stop 16 may engage the shaft 18 or a clip or object extending from the shaft, as desired.

Figure 5:
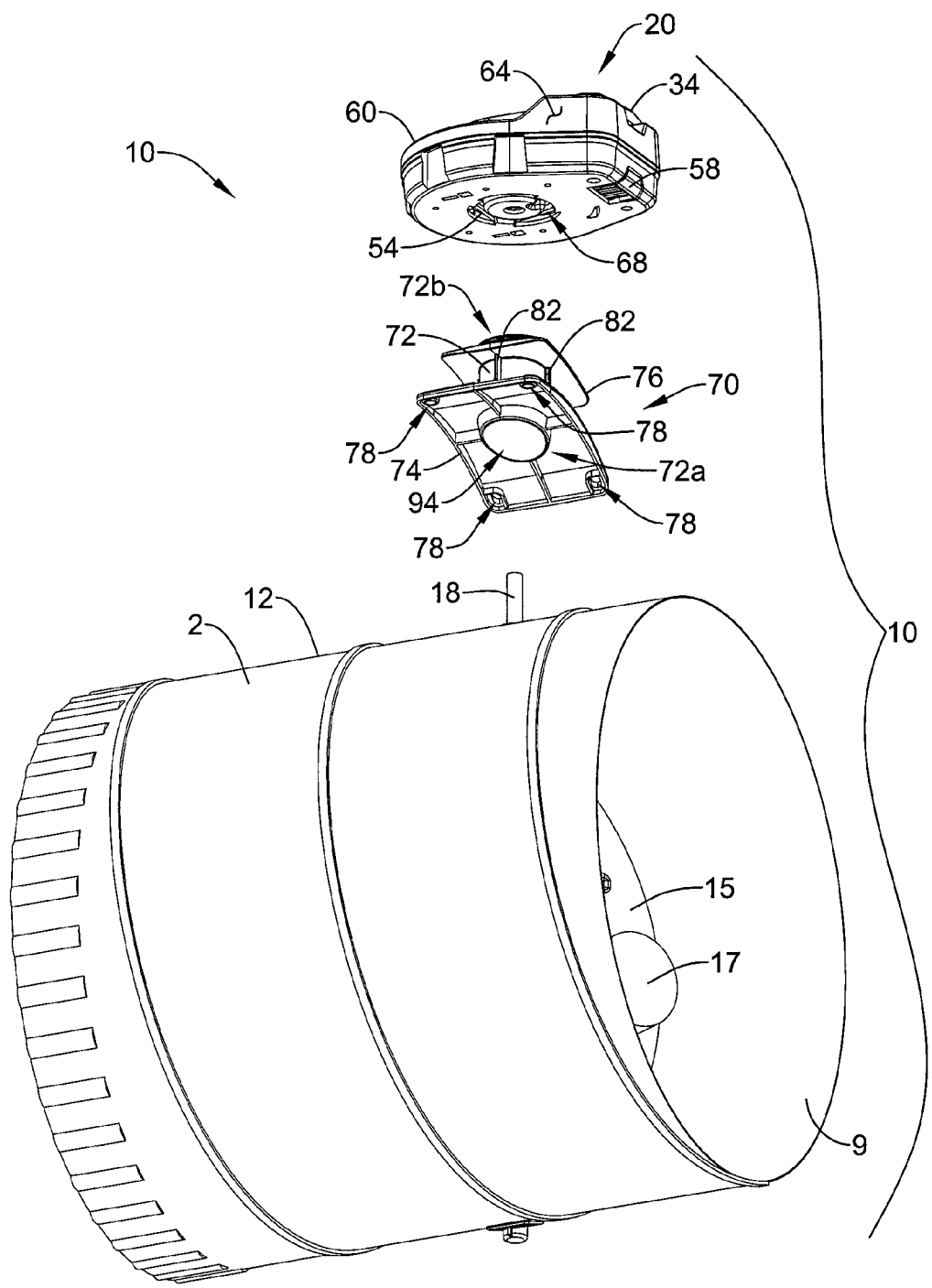
FIG. 5 is a schematic exploded perspective bottom view of the illustrative damper system and duct section of FIG. 1.

FIG. 5 is a schematic exploded view from a bottom of the damper system 10, with the damper actuator 20 and duct 2 separated from the standoff 70. The bottom of damper actuator 20, as seen in FIG. 5, may include a connector opening 68 through which a second end 72b of the standoff 70 may extend to connect with the damper actuator 20. After standoff 70 has been connected with the damper actuator 20 and when the damper actuator 20 is to be released from the standoff 70, connector release 58 may be actuated to release body connector 96 from connector 54, as discussed in greater detail below.

Figure 6:
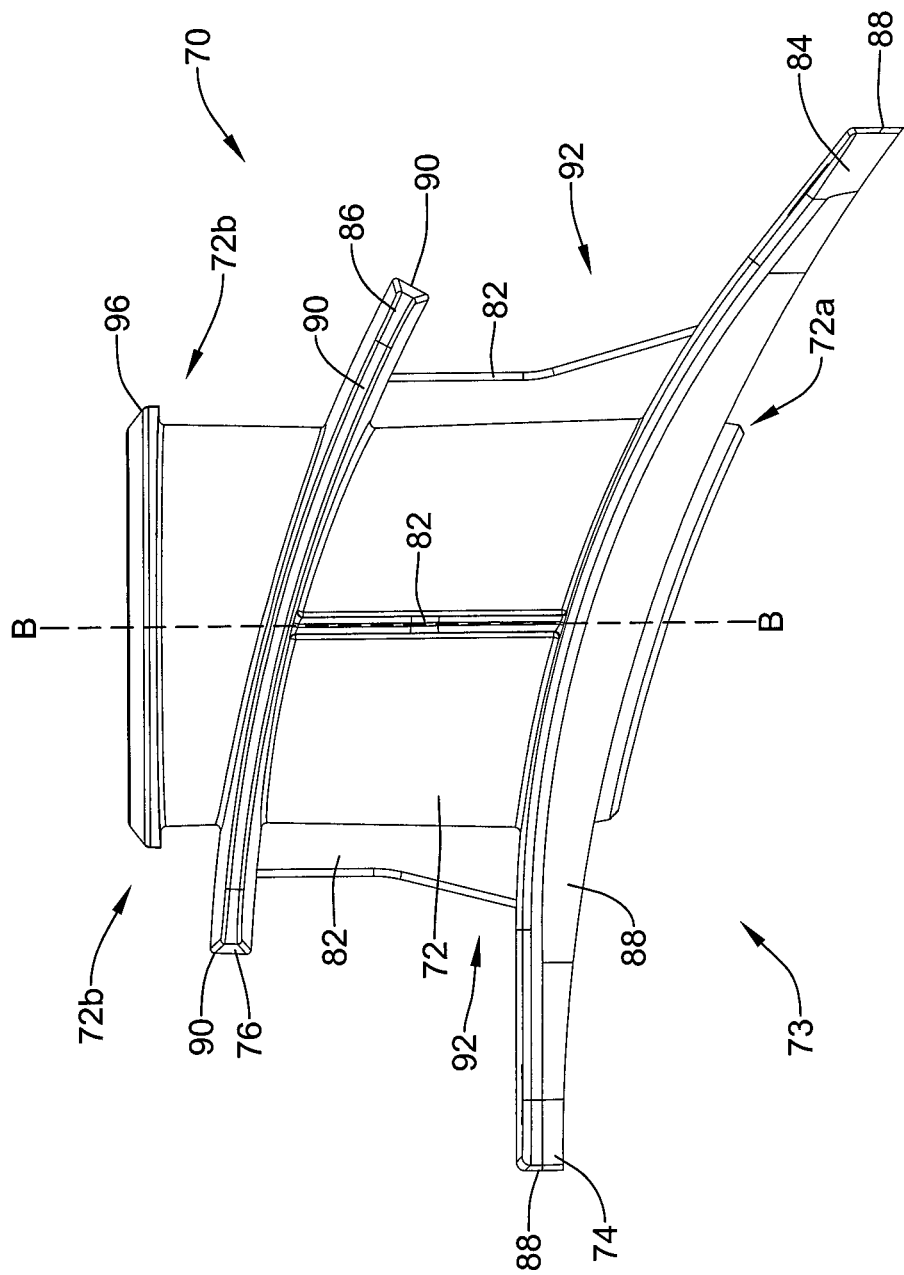
FIG. 6 is a schematic side view of an illustrative standoff of the illustrative damper system of FIG. 1.
Figure 7:
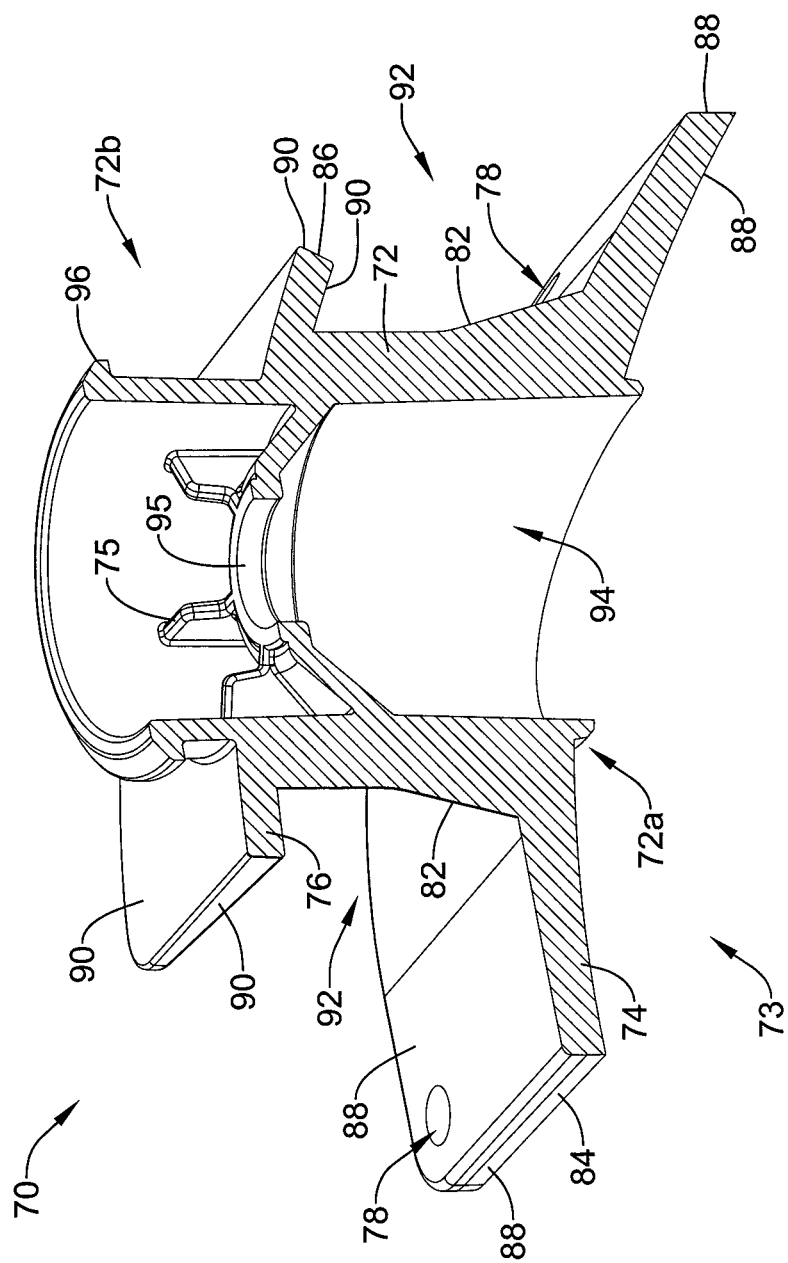
FIG. 7 is a schematic perspective cross-sectional view of the illustrative standoff of FIG. 6.

As seen in one or more of FIGS. 5-7, the standoff 70 may be comprised of one or more pieces of material fitted together and may include a body 72, a mounting mechanism 73, and a flange 76 spaced from the mounting mechanism 73. The mounting mechanism may include, but is not limited to, a first end 72a of the body 70 and a first flange 74, where the mounting mechanism 73 and at least the first flange 74 may be configured to facilitate mounting the body 72 relative to a duct 2 adjacent an outer surface 12 of the duct 2. Illustratively, the flange 76 may be a second flange 76 spaced from the first flange 74, where a space 92 configured to receive the insulating layer 13 is formed between the first flange 74 and the second flange 76. Thus, when so configured, the first flange 74 may be mounted relative to the outer surface 12 of the duct 2 and the body 72 extends through (or receives) the insulating layer 13 of the duct 2 such that the second flange 76 may be positioned adjacent an outer surface 14 of the insulating layer 13. In some cases, the standoff 70 may be mounted to the duct 2 from inside the duct 2, where the first flange 74 may be mounted to an inner surface 9 of the duct 2 and the body 72 may be inserted through the duct. The second flange 76 may facilitate taping the insulation layer to the standoff 70 and may be a taping flange. In some cases, the body 72 may have the first end 72a extending through the first flange 74 and an opposing second end 72b extending through the second flange 76, as seen in FIG. 6, or body 72 may take on any other desired orientation with respect to the first flange 74 and the second flange 76 to create the open space 92.

As shown in FIGS. 5 and 7, the first flange 74 may include one or more mounting holes 78 configured to receive a fastener 80 that may be configured to fasten the first flange 74 to the outer surface 12 or the inner surface 9 of the duct 2. Alternatively, or in addition, the mounting mechanism 73 and/or the first flange 74 may take on a configuration that facilitates a connection to the duct 2 by twisting onto and/or engaging the duct 2 in a bayonet-style and may be held in place with a snap, latch, screw, etc.; the mounting mechanism 73 and/or the first flange 74 may connect to the duct 2 with a nut positioned on or about the duct 2 that may engage threads on the bottom of or that extend from the mounting mechanism 73 and/or the first flange 74; the mounting mechanism 73 and/or the first flange 74 may connect to the duct 2 by engaging a retaining part on the inner surface 9 of the duct 2 that snaps onto, slides onto, twists onto, otherwise engages features of the mounting mechanism; the mounting mechanism 73 and/or the first flange 74 may connect to the duct 2 by using an adhesive; the mounting mechanism 73 and/or the first flange 74 may connect to the duct 2 in any other releasable or non-releasable manner; and/or the mounting mechanism 73 and/or the first flange 74 may connect to the duct 2 in any combination thereof.

As discussed above, to add support to the body 72 and the flanges 74, 76, the standoff 70 may have one or more ribs 82 extending to or from one or more of the flanges 74, 76 and from or to body 72. For example, one or more ribs 82 may extend between the first flange 74 and the body 72 of standoff 70. In some instances, the rib(s) 82 may extend entirely from the first flange 74 to the second flange 76 along body 72 or the rib(s) 82 may extend partially the distance between the flanges 74, 76 along body 72.

The second end 72b of the standoff 70 may connect to a connector 54 (e.g., a clip connector or another connector type) at or near the body connector 96, such that the housing 60 of the actuator 20 may be fixed with respect to the shaft 18. The body connector 96 may be any type of connector configured to engage or facilitate engagement of the standoff 70 with the connector 54. For example, the body connector 96 may include a ridge capable of making a snapping or other connection with the connector 54, as shown in FIG. 6; the body connector 96 may include an indentation configured to receive and connect with the connector 54; or, the body connector 96 may take on any other form that may be configured to connect with the connector 54, as desired.

The body 72 of the standoff 70 may have a pass-through cavity 94 that extends from the first end 72a of the body 72 through to the second end 72b of the body 72. The pass-through cavity 94 may be configured to receive the damper shaft 18 and have shaft 18 pass therethrough. Further, the pass-through cavity 94 may be configured to have a bearing surface 95 configured to engage and/or abut a bearing in communication with the shaft 18.

In some instances, where the body 72 includes the connector 96 (e.g., a releasable connector) and is connected to the damper actuator 20, the standoff 70, the damper actuator 20, and the damper shaft 18 may be configured to drive the damper blade 15. In addition, or alternatively, the pass through cavity 94 may receive other features and have one or more of those other features pass therethrough. For example, where a temperature sensor, pressure sensor, flow sensor, or other electronic, chemical, or mechanical sensor or probe or object is positioned within duct 2, about or adjacent duct 2, or is exposed to an interior volume of an insulated duct 2, one or more wires supporting the sensor or electronic object may pass from the duct and at least partially through the pass-through cavity or opening 94 of the standoff 70.

As shown in FIG. 7, the pass through cavity 94 and/or the body 72 may be elongated and extend along a main body axis B-B, where the flanges 74, 76 extend radially outward relative to the main body axis B-B. For example, the first flange 74 may have a first flange perimeter 84 defined by one more first flange sides 88, where the first flange 74 extends outward (e.g., extends radially) relative to the main body axis B-B to the first flange perimeter 84. Further, in the example, the second flange 76 may have a second flange perimeter 86 defined by one or more second flange sides 90, where the second flange 76 extends outward (e.g., extends radially) relative to the main body axis B-B to the second flange perimeter 86. The first flange perimeter 84 may be defined by any number of sides 88 and the second flange perimeter 86 may be defined by any number of sides 90. For example, each perimeter 84, 86 may have one side 88, 90 (e.g., where the flanges 74, 76 have a circular and/or rounded shape), respectively; at least two sides 88, 90, respectively; at least three sides 88, 90, respectively; at least four sides 88, 90, respectively; or any other number of sides 88, 90, respectively, having sharp or rounded corners, as desired. As discussed, the open space 92 configured to receive an insulating layer 13 may extend between the first flange perimeter 84, the second flange perimeter 86, and the main body 72.

As seen in FIGS. 8-12, damper actuator 20 may include a housing 60 having a bottom 60a and a top 60b, with a handle 34 and a connector release or quick release 58 accessible through or from the exterior surface 64 of housing 60 and configured to engage the clip and release the housing 60 from a fixed position with respect to the shaft 18 and/or the standoff 70. In some cases, a drive gear arm 32 of a drive gear mechanism 28 may extend from or extend through or be formed integral with the housing 60, such that the drive gear arm 32 may be configured to engage the handle 34. In addition, or alternatively, the handle 34 and the drive gear arm 32, along with the drive gear 30, may be integrally formed of one or more pieces of material. To facilitate operation of the drive gear mechanism 28, as further discussed below, the drive gear arm 32 may extend from the housing 60 at a position adjacent a contact surface or area 66 of the housing 60 and connect with handle 34 such that the handle 34 may be configured to hinge about the drive gear arm 32 and about a fulcrum when in an opened or second position. Illustratively, the fulcrum may be accomplished by a raised ridge or shoulder extending any distance around the connection of the handle 34 with the drive gear arm 32, a raised feature (e.g., a bump) on the top surface 37 of the handle 34 that makes contact with a flat, raised or indented surface that at least partially surrounds the connection of the handle 34 with the drive gear arm 32, or any other feature configured to act like a fulcrum, as desired.

Illustratively, the handle 34 may include a bottom surface 36 and a top surface 38, where the top surface 38 may include brand indicia 55 and/or other markings, as desired. In some instances, the housing 60 may form a handle gap 61 below the handle 34, which may be defined at least partially by the exterior surface 64 of the housing 60 and the bottom surface 36 of the handle 34. The handle gap 61 may be configured to facilitate opening the handle 34 by applying a force on the bottom surface 36, where opening the handle 34 may include moving it from a first position to a second position.

Figure 8:
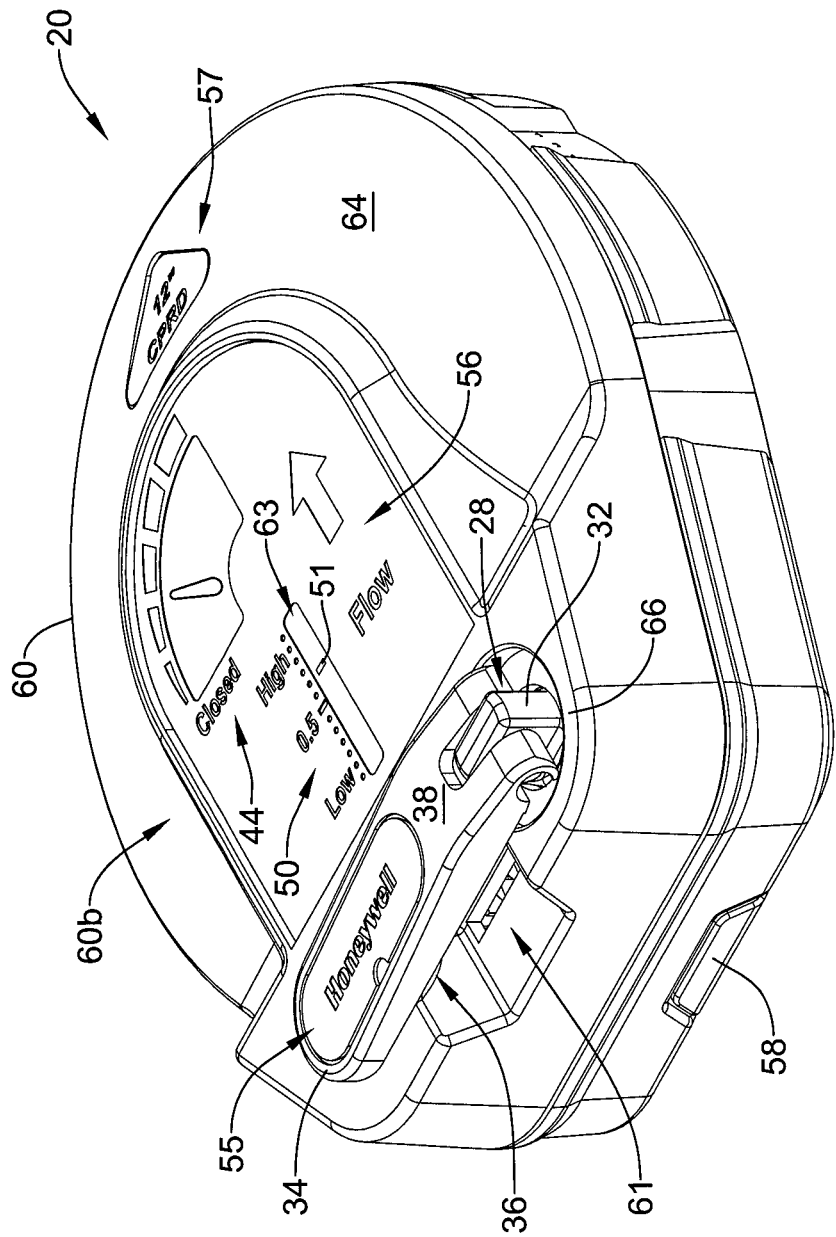
FIG. 8 is a schematic perspective top view of an illustrative damper actuator of the illustrative damper system of FIG. 1.

In some instances, one or more visual indicators may be visible from the exterior of the housing 60. For example, as shown in FIG. 8, one or more of a damper blade position indicator 44, a pressure level indicator 50, an air flow direction indicator 56, duct size indicator 57, and any other indicator or indicia may be viewed on or through or positioned on the exterior of housing 60. The structure and position of these indicators 44, 50, 56 are discussed in greater detail below.

Figure 9:
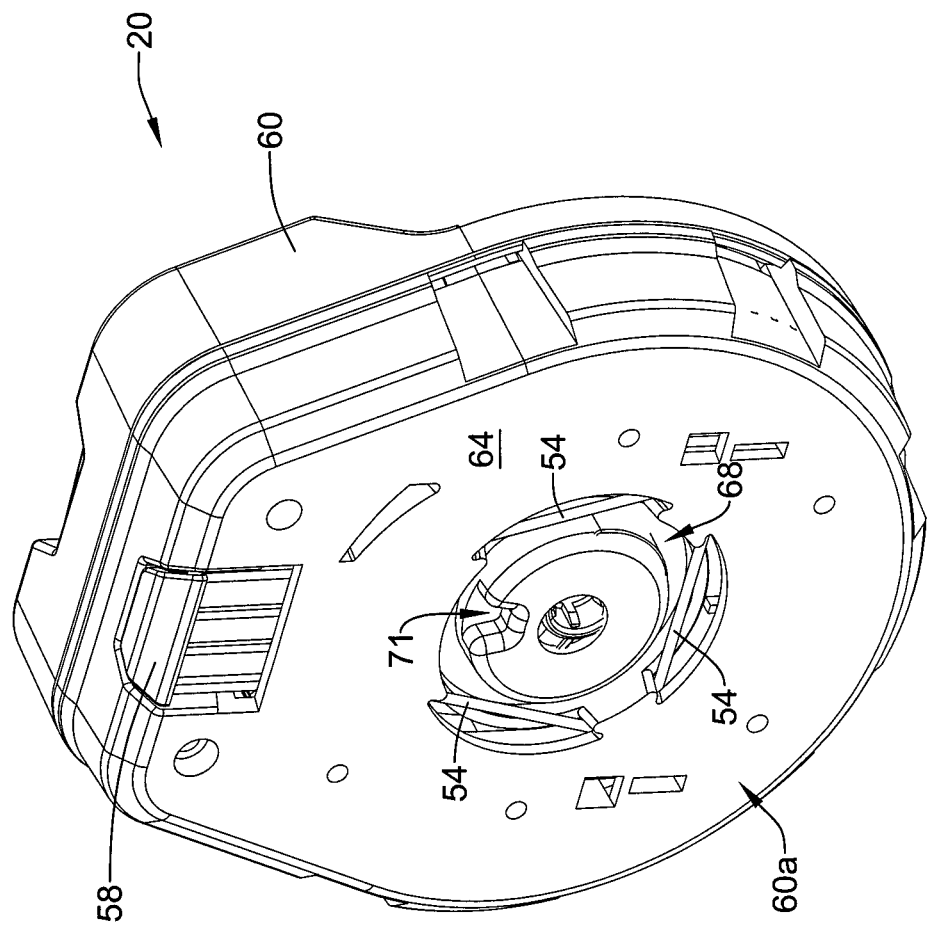
FIG. 9 is a schematic perspective bottom view of the illustrative damper actuator of FIG. 8.
Figure 10:
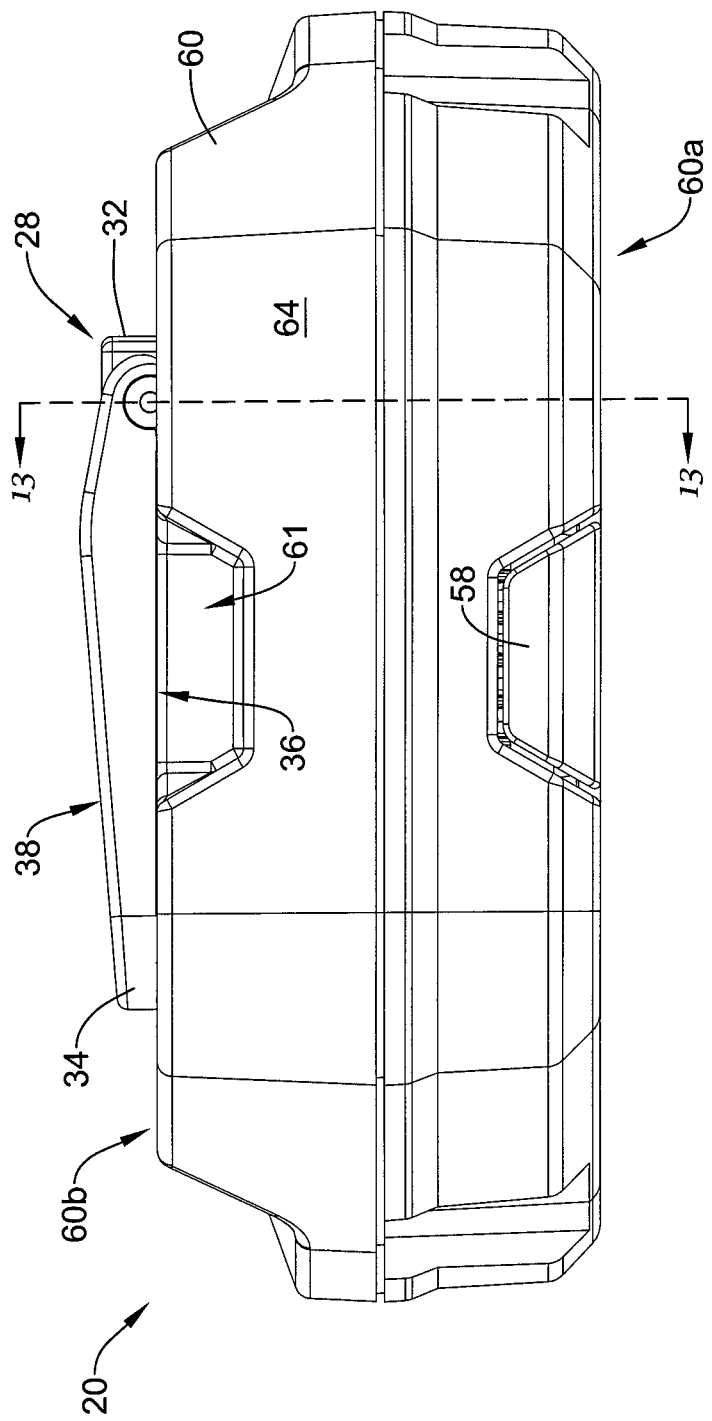
FIG. 10 is a schematic first side view of the illustrative damper actuator of FIG. 8.
Figure 11:
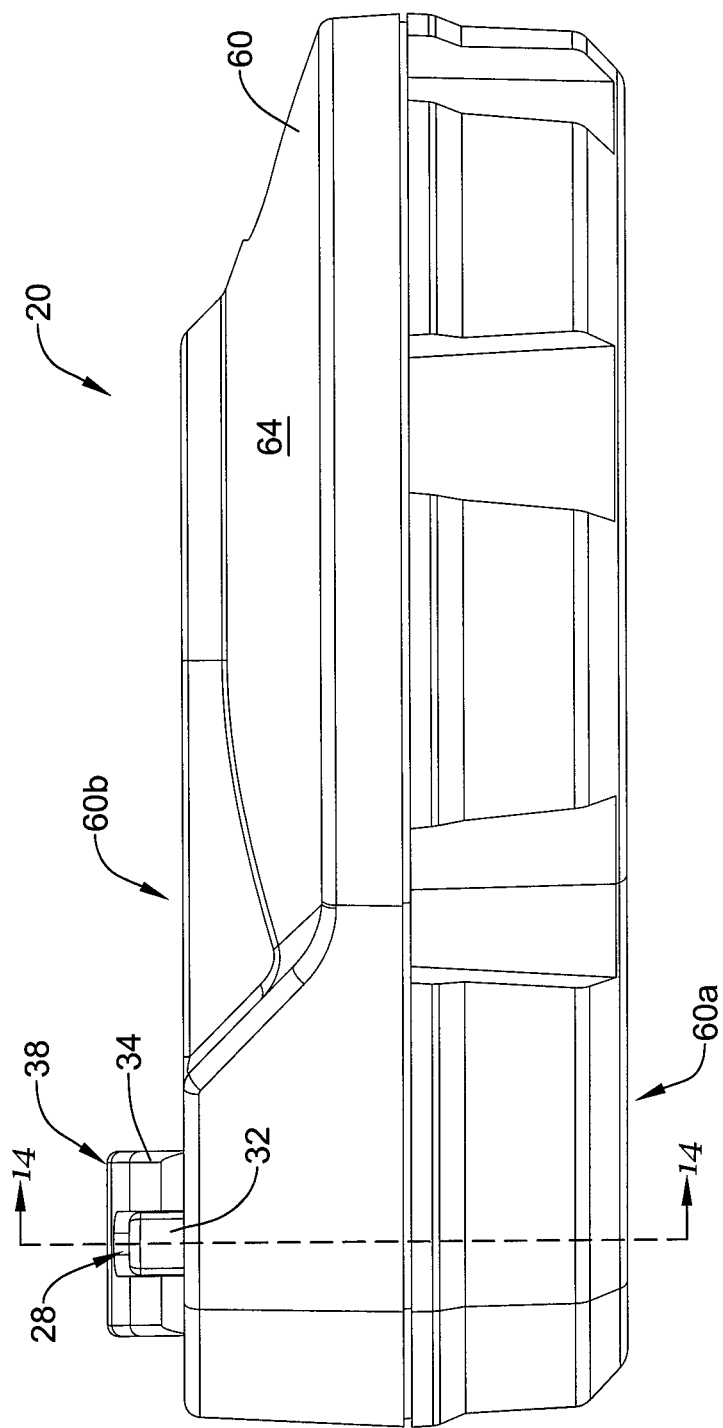
FIG. 11 is a schematic second side view of the illustrative damper actuator of FIG. 8.
Figure 12:
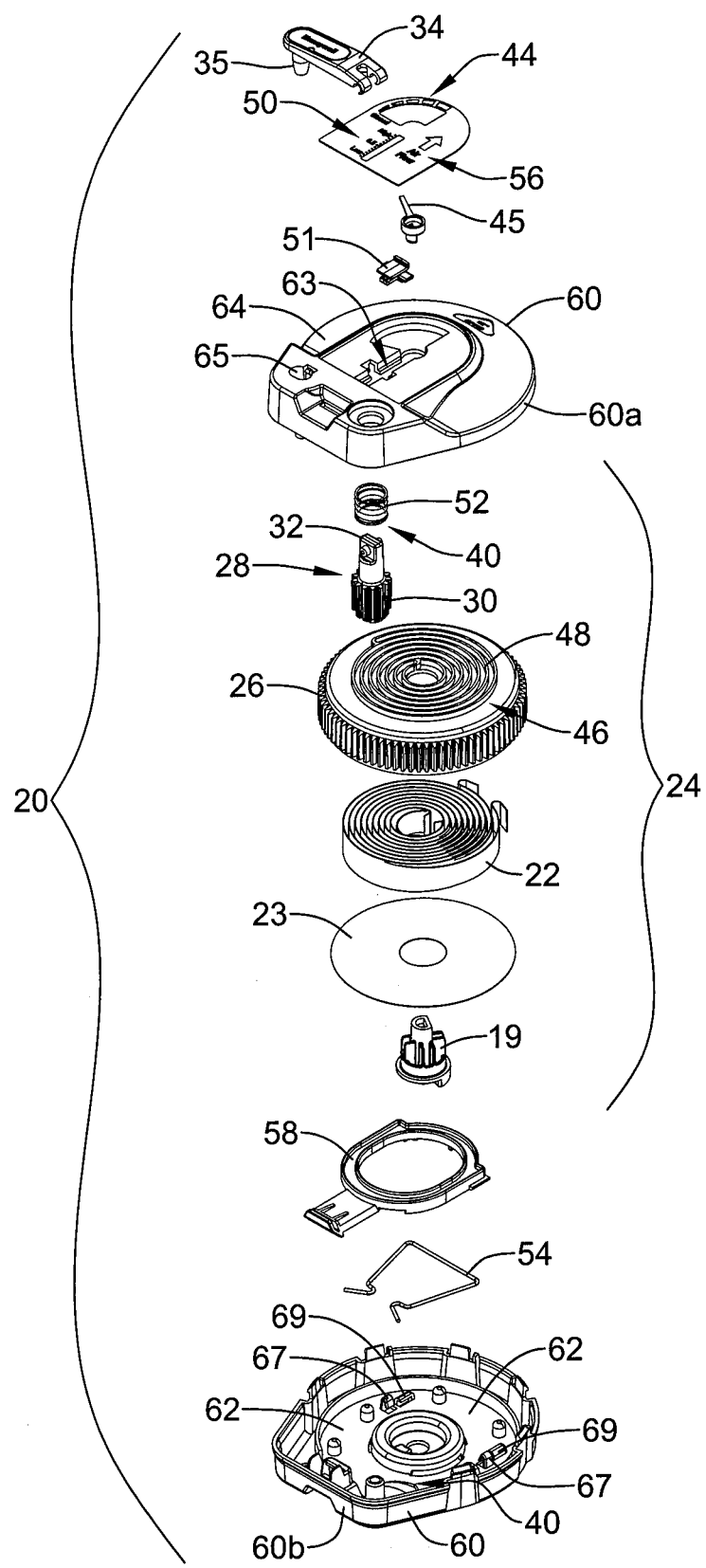
FIG. 12 is a schematic exploded perspective top view of the illustrative damper actuator of FIG. 8.

As shown in FIGS. 9 and 12, the housing 60 may include a connector opening 68 through which an object may engage a connector 54 or any other type of connector. The connector 54 may be any type of connector configured to receive body connector 96 of the standoff 70. For example, the connector may be a u-clip connector, as seen in FIG. 12, or any other desired clip or other connector or fastener. In some cases, a connector release 58 may be in communication with the connector 54 and may extend from interior the housing 60 to exterior the bottom side 60a of housing 60 or to any other position in relation to housing 60. Although the connector release 58 may take on any configuration based at least partially on the type of connector (e.g., clip connector 54) used in damper actuator 20, the connector release 58 depicted in FIG. 9 may operate by facilitating a release of an object connected to clip connector 54 through applying a force in the direction of the connector opening 68 to an end of the connector release 58 extending exterior the housing 60. Once the force is applied to connector release 58, the connector release may act on an open end of the connector 54 to spread or open the connector and release a body connector 96 inserted through connector 54.

In relation to the housing 60, the connector 54 may be positioned substantially interior the housing 60. Illustratively, the connector 54 may be positioned around a connector opening 68 in the housing 60 and may be snapped into place. In order to engage the body connector 96 of the standoff 70, the connector 54 may extend through one or more openings in the housing 60 adjacent the connector opening 68 to engage a body connector 96 extending into and/or through the connector opening 68. In some instances, the connector release 58 may be positioned around and/or over the connector 54 and may be configured to slide radially with respect to the connector opening 68. The connector release 58 may be connected to housing 60 in any manner, for example, the connector release 58 may be snapped into clasps 67 extending from the interior surface 62 of the housing 60 and may be configured to slide along or within guides 69.

In addition to, or alternatively to, the actuator 20 being connectable to and releasable from the standoff 70 with the connector 54 and the connector release 58, the actuator 20 may be connected to the standoff 70 in any similar or dissimilar manner, as desired. For example, the actuator 20 may connect to the standoff 70 by twisting onto and engaging the standoff 70 in a bayonet-style and may be held in place with a snap, latch, screw, etc.; the actuator 20 may be screwed onto the standoff 70 at the second flange 76 and/or with a flange of the housing 60, where the flanges may be substantially normal or parallel to the shaft 18; the actuator 20 may connect to the standoff 70 with a nut positioned on or about the standoff 70 that may engage threads on the bottom of or that extend from the actuator 20; the actuator 20 may connect to the standoff 70 with a nut and lever connection; the actuator 20 may connect to the standoff 70 in any other releasable or non-releasable manner; and/or the actuator 20 may connect to the standoff 70 in any combination thereof.

In some instances, the housing 60 may include a female key 71 (or a male key or other key, as desired) within the connector opening 68. The female key 71 may be configured to engage one or more ribs or male keys 75 (see FIG. 7) (or female key or other key, as desired). Any connections between keys 71, 75 may facilitate fixing the actuator 20 in a position with respect to standoff 70, the shaft 18, the duct 2, and/or other features. For example, the connector 54 and the keys 71, 75 may be configured to fix the actuator 20 translationally in three degrees of freedom and rotationally in three degrees of freedom with respect to the standoff 70, shaft 18, the duct 2, and/or other features. Alternatively, or in addition, the locks 71 and 75 may be configured to connect the actuator 20 to the standoff 70 such that the actuator may only connect in a single orientation or in a limited number of orientations with respect to the standoff 70, the shaft 18, the duct 2, and/or other features.

The damper system 10 may be used in conjunction with one or more ducts 2 and may include the damper blade 15 positioned within the duct 2 and in communication with the shaft 18, such that the shaft 18 may be configured to affect movement of the damper blade 15 within the duct 2 and about a damper blade rotation axis between a first position and a second position different than the first position. Illustratively, the damper actuator 20 may communicate with the shaft 18 to move the damper blade 15 from the first position to the second position. To facilitate such movement, the damper actuator 20 may include a soft spring and/or a torsion spring 22 (e.g. coil spring) that may be in communication with the shaft 18, where the soft spring and/or torsion spring 22 may be configured to provide a bias force to the shaft 18 and apply a counter balance or bias to the damper blade 15 toward one of the first or second positions, or any other position. Further, the damper actuator 20 may include a housing 60 that at least partially encloses the torsion spring 22 and other features of the damper actuator 20 including, but not limited to, a winding or bias force adjustment mechanism 24, where the mechanism 24 may be in communication with the torsion spring 22 and may be configured to load the torsion spring 22 or otherwise adjust the bias force provided from the torsion spring 22 to the shaft 18.

Illustratively, a soft spring may be a spring having a low stiffness. For example, a soft spring may have a low stiffness if it has a stiffness in the range of 0.1 Newton-millimeters/degree to 0.6 Newton-millimeters/degree, 0.02 Newton-millimeters/degree to 1.0 Newton-millimeters/degree, 0.02 Newton-millimeters/degree to 2.0 Newton-millimeters/degree, or other range of stiffness, as desired. Whether a stiffness of a spring is considered a low stiffness may depend at least partially on the size of duct to which the soft spring is to be applied. For example, a low stiffness spring used in conjunction with an eight inch duct may have a stiffness of or about 0.11 Newton-millimeters/degree; a low stiffness spring used in conjunction with a ten inch duct may have a stiffness of or about 0.16 Newton-millimeters/degree; a low stiffness spring used in conjunction with a twelve inch duct may have a stiffness of or about 0.29 Newton-millimeters/degree; and a low stiffness spring used in conjunction with a fourteen inch duct may have a stiffness of or about 0.50 Newton-millimeters/degree.

Figure 17:
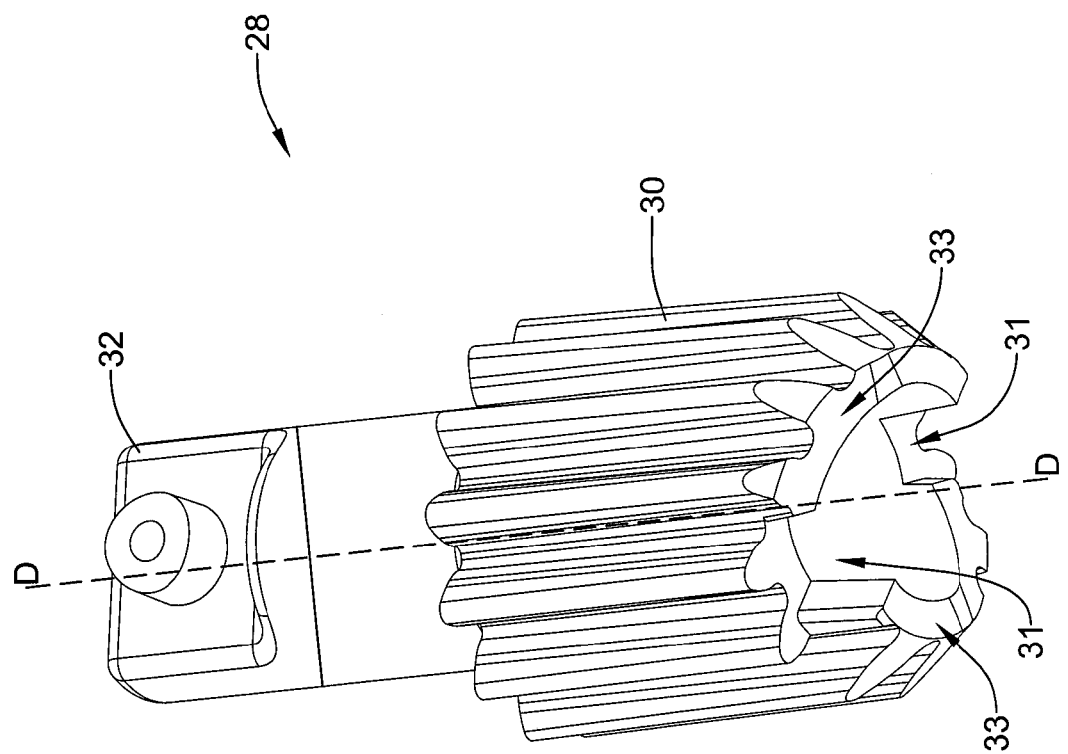
FIG. 17 is a schematic bottom perspective view of an illustrative drive gear mechanism.

As shown in FIG. 12, the winding or bias force adjustment mechanism 24 may include two gears and the back driving clutch or reverse stop mechanism 40 having a stop member 42 and a spring 52, or may take on a different configuration. In some instances, mechanism 24 may include a driven gear 26 in communication with the torsion spring 22 and a drive gear 30 in communication with the driven gear 26, where the drive gear 30 and/or the driven gear 26 may engage the back driving clutch or reverse stop mechanism 40 to facilitate preventing unintended movement of the gears 26, 30 in a direction biased by the torsion spring 22. Illustratively, the drive gear 30 may be formed as a portion of the drive gear mechanism 28, which may also include the drive gear arm 32. Where the drive gear 30 engages a stop member 42, the drive gear 30 may have an end with a chamfered portion 33 leading to a stop member engaging portion 31, where the stop member engaging portion 31 may be a cut-away in an end of drive gear 30, as best shown in FIG. 17, and may be configured to receive or engage the stop member 42. In some instances, the winding mechanism or bias force adjustment mechanism 24 may optionally include features in addition to the driven gear 26 and the drive gear 30 that include, but are not limited to, the handle 34 (not shown as part of the winding mechanism or bias force adjustment mechanism 24 in FIG. 12), shaft connector 19, the torsion spring 22, torsion spring plate 23, the drive gear arm 32, a spring 52, indicator arms 45, 51, spiral groove 48, and other desired features.

Figure 13:
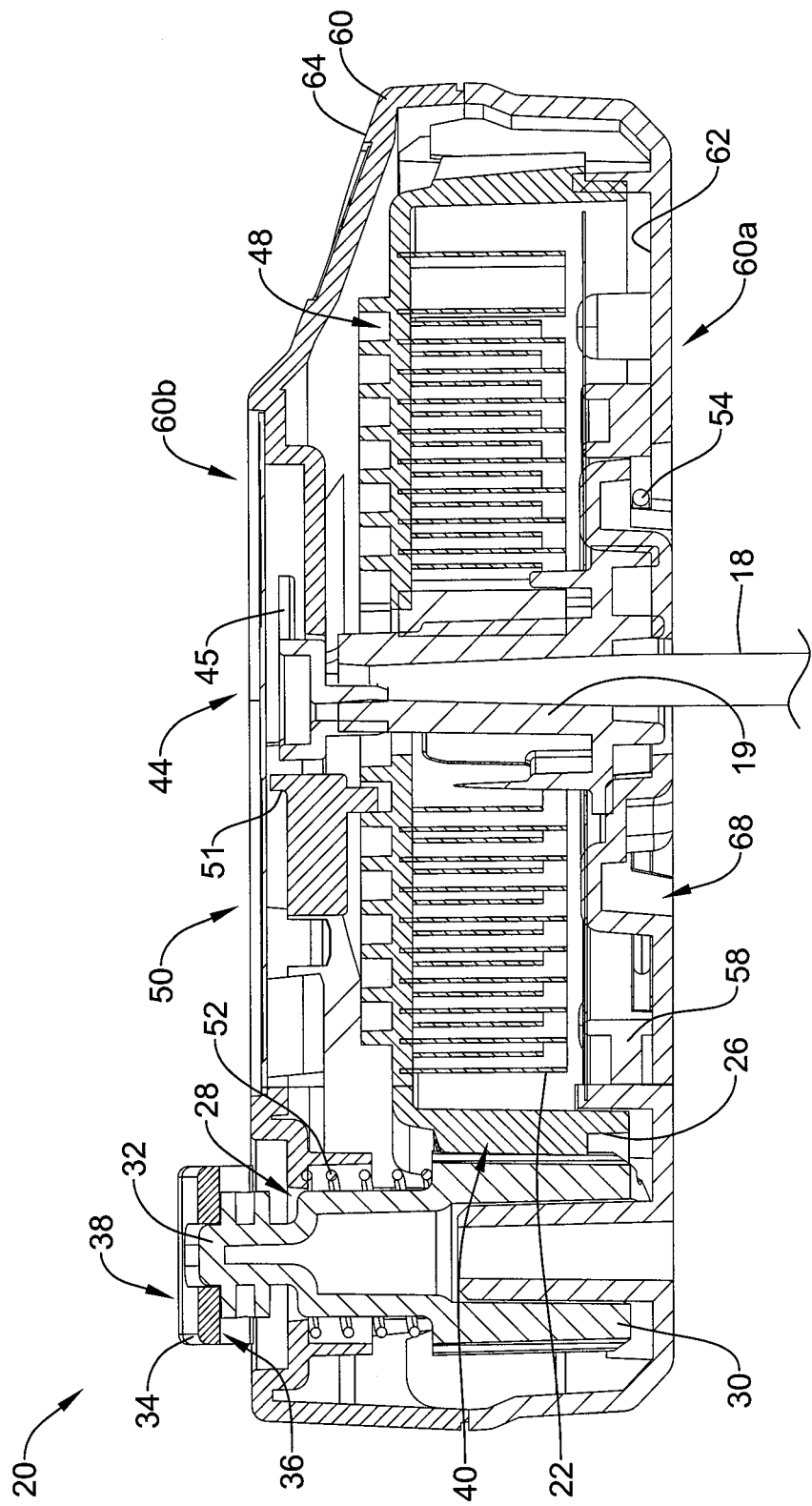
FIG. 13 is a schematic cross-sectional view of the illustrative damper actuator of FIG. 10 taken along line 13-13.

The handle 34 may communicate with the drive gear 30 of the drive gear mechanism 28 through the drive gear arm 32. Through interaction with the drive gear 30 which may engage driven gear 26, the handle 34 may drive the driven gear 26 as the handle 34 is actuated (e.g., rotated). The torsion spring 22 may be in communication with the shaft 18 and the driven gear 26 through a mechanical couple or other direct or indirect coupling to operate in response to actuation of the handle 34. In some instances, the torsion spring 22 may be positioned substantially between an outer circumference of the shaft 18 and an inner circumference of the driven gear, as best shown in FIG. 13. The torsion spring 22 may be directly or indirectly connected to the shaft 18. For example, where the torsion spring 22 is indirectly connected to the shaft 18, the torsion spring 22 may connect to the shaft connector 19, which, in turn, may be connected to shaft 18. Further, as the torsion spring 22 may be in communication with the shaft 18 and the driven gear 26, the torsion spring 22 may operate to bias the shaft 18 and driven gear 26 in a first direction. In such an instance, the handle 34 may be actuated to move the driven gear 26 in a first or second direction. Where torsion spring 22 is connected to the shaft connector 19, the shaft connector 19 may allow for winding or unwinding of the torsion spring 22 through rotation of the driven gear 26 to establish a pressure set point or threshold by adjusting the amount of pressure required to crack open the damper blade 15 from the damper stop 16 (e.g., a crack pressure), while allowing shaft 18 to rotate against the bias of the torsion spring 22 in response to a pressure differential between the inlet and outlet of (e.g., a pressure differential across the damper blade) the duct 2 (or a force against the damper blade 15) above the crack pressure and facilitating the indication of a position of the damper blade 15 through the damper blade position indicator 44. An established pressure set point or crack pressure may be a pressure level expressed by a numerical value with some pressure units. Alternatively, or in addition, the established pressure set point or crack pressure may be set by relative position. For example, where a pressure level indicator 50 may be utilized, the pressure set point or crack pressure may be set relative to tick marks or other markings of the pressure level indicator 50, where the tick marks or other markings may or may not be related to a known numerical value and may be viewable from exterior the housing 60.

As the driven gear 26 is biased in the first direction, a lock may be utilized to secure the driven gear 26 at a desired position to maintain an established or desired pressure set point or threshold (e.g., a crack pressure). Such a lock of the driven gear 26 may result in the torsion spring 22 and the shaft 18 resisting rotational moments to the shaft below the torque applied by the torsion spring 22, while also preventing the total unwinding of the torsion spring 22. For example, a back driving clutch mechanism or reverse stop mechanism 40 may be utilized to lock the driven gear 26 in a particular rotational position. In some cases, the back driving clutch mechanism or reverse stop mechanism 40 may be configured to unlock drive gear 30 from a reverse stop member 42. Alternatively, or in addition, the back driving clutch mechanism or reverse stop mechanism 40 may engage the driven gear 26, as desired.

Figure 14:
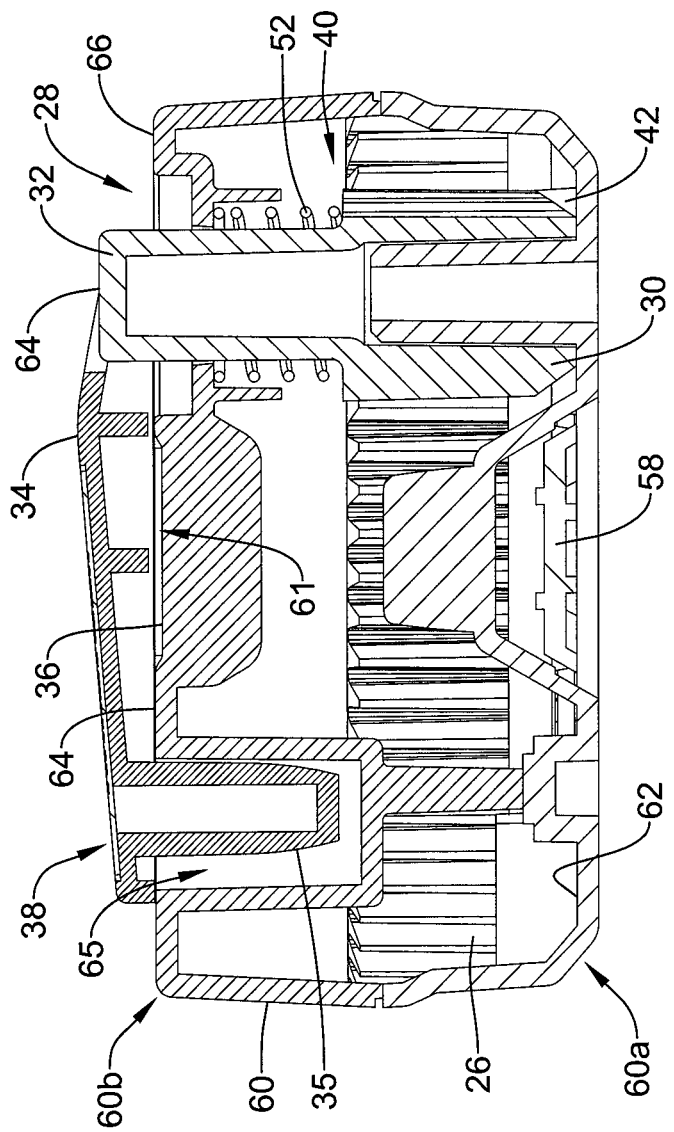
FIG. 14 is a schematic cross-sectional view of the illustrative damper actuator of FIG. 11 taken along line 14-14, with the handle in a first handle position.
Figure 15:
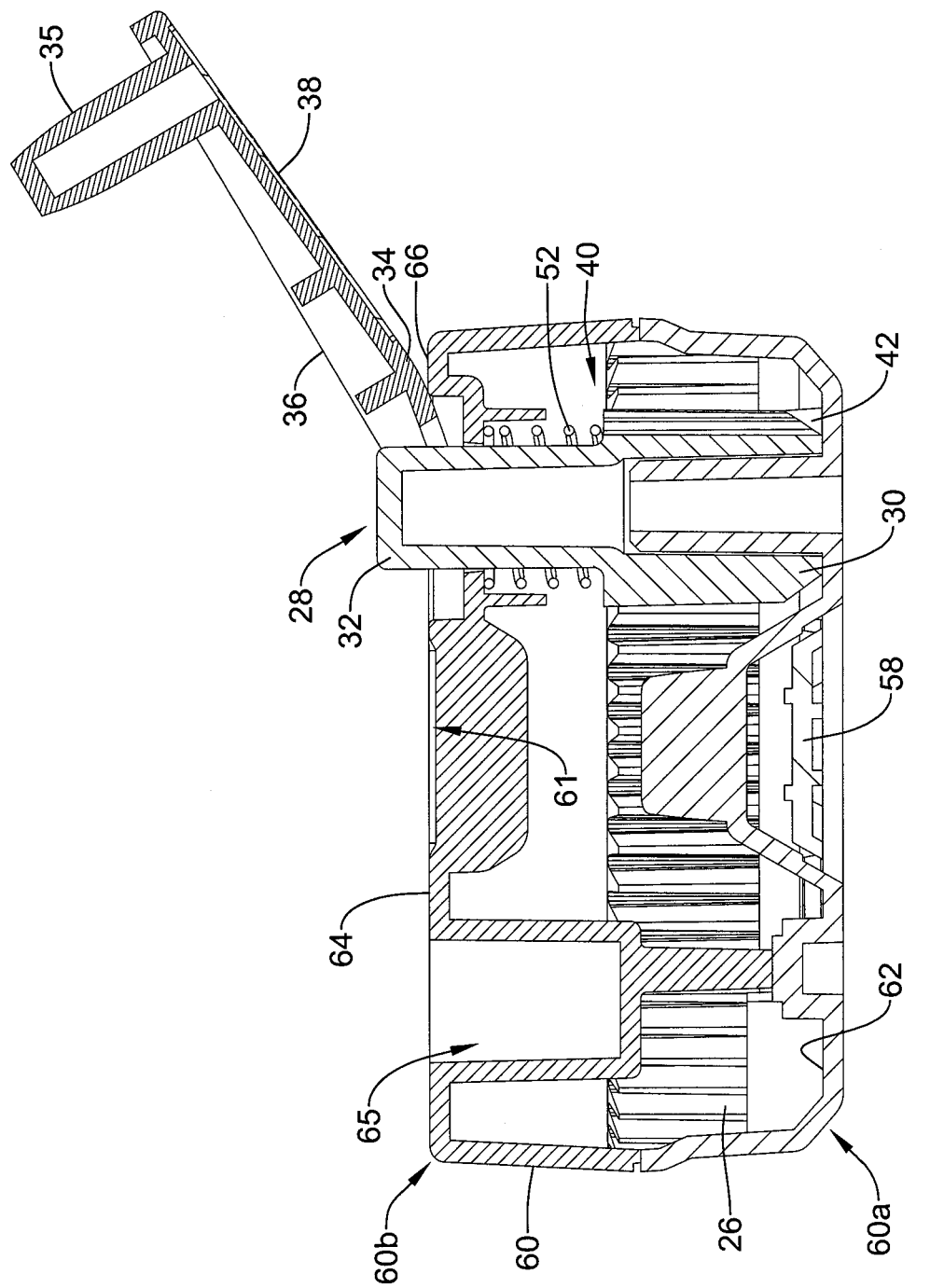
FIG. 15 is the schematic cross-sectional view of the illustrative damper actuator of FIG. 14 with the handle in an opened position.
Figure 16:
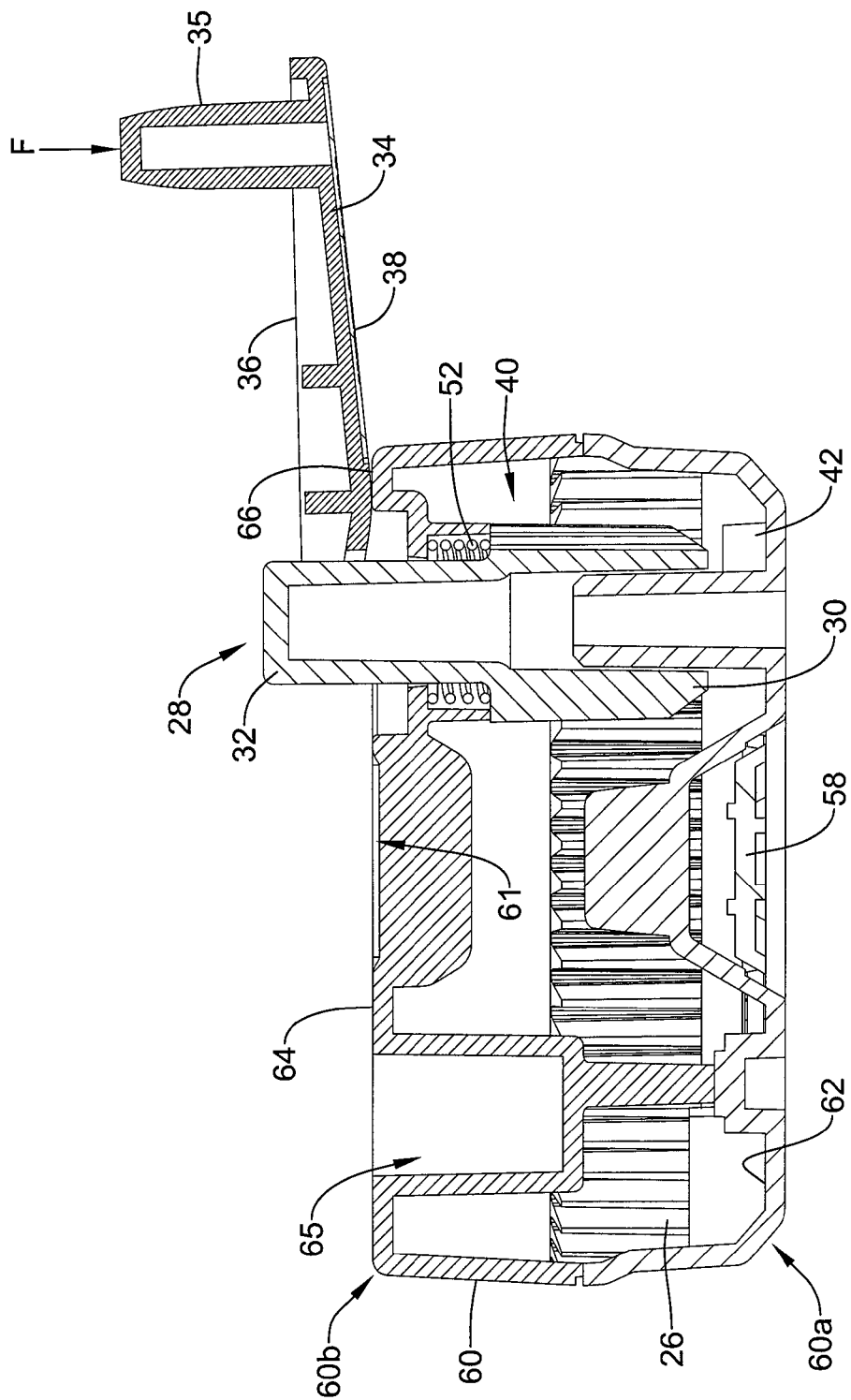
FIG. 16 is the schematic cross-sectional view of the illustrative damper actuator of FIG. 14 with the handle in a second handle position.

As seen in FIGS. 14-16, the reverse stop mechanism 40 may include the reverse stop member 42 extending from an interior surface 62 of the bottom 60b of the housing 60. Optionally, a spring 52 positioned about or adjacent the drive gear mechanism 28 may be included with the back driving clutch mechanism or reverse stop mechanism 40 or, alternatively, the spring 52 may be separate from the back driving clutch mechanism or reverse stop mechanism 40. The stop member 42 of the reverse stop mechanism 40 may take on any shape or size and may be configured to engage the drive gear 30 or other rotational feature in any manner. In some cases, the reverse stop member 42 may be a single feature or a plurality of features extending from the interior surface 62 of the bottom 60b of the housing 60. For example, the reverse stop member 42 may include two features extending from the interior surface 62 of the bottom 60b of the housing 60, where at least one of the two features is configured to engage a stop member engaging portion 31 of the drive gear 30 such that a handle 34 is aligned with and/or positioned to fit within a handle opening 65 in the housing 60.

In some cases, it may be possible to increase the strength of the reverse stop member 42 and reduce the stress thereon by increasing the number of reverse stop members 42 configured to engage the drive gear 30 or other features. At the same time, it is understood that having many reverse stop members 42 configured to engage the drive gear 30 or other features may result in shorter time periods for the drive gear 30 to engage the reverse stop member 42. Thus, both increasing the strength of the reverse stop member 42 and lowering the amount of time of the time periods for the drive gear 30 to engage the reverse stop member 42 may be weighed when designing the reverse stop member 42.

In addition to, or alternatively to, utilizing the back driving clutch mechanism 40 to lock the driven gear 26 in place and/or prevent the torsion spring 22 from unwinding, one or more other locking techniques or mechanisms may be utilized. For example, the driven gear 26 and/or torsion spring 22 may be locked in place through a button or lever mechanism that must be held to wind or unwind the spring 22; through a friction lock (e.g., with a gear system having a low gear ration); through any other locking mechanism; and/or any combination thereof.

As discussed, the damper blade position indicator 44 may be positioned adjacent an exterior of the housing 60, at least partially (e.g., halfway, substantially, etc.) within the housing 60, and/or so as to be at least partially viewable from the exterior of the housing 60, where the damper blade position indicator 44 may be configured to display a measure related to the current position of the damper blade 15 within the duct 2. For example, the measure may include an axial position of the damper blade 15, a distance of the damper blade 15 from the damper stop 16, or any other measure related to the current position of the damper blade 15 within the duct 2. In some instances, a damper blade position indicator arm 45 of the damper blade position indicator 44 may be connected to the shaft 18, such that indicator arm 45 may move in response to movement of the shaft 18. As desired, the damper blade position indicator arm 45 may be directly connected to the shaft 18 or may be indirectly connected to the shaft 18 through the shaft connector 19, (as shown in FIG. 13).

As discussed, the pressure level indicator 50 may be positioned adjacent an exterior of the housing 60 that at least partially encloses the torsion spring 22, at least partially (e.g., halfway, substantially, etc.) within the housing 60, and/or so as to be at least partially viewable from exterior the housing 60. The pressure level indicator 50 may be configured to display a measure related to the bias force provided from the torsion spring 22 to the shaft 18, where the measure related to the bias force may include a pressure set point, pressure level, or force amount applied to the shaft 18 from the torsion spring 22. In some instances, the pressure level indicator 50 may engage a spiral indicator mechanism 46 having a spiral groove 48 configured to rotate about the shaft 18 in response to movement of the driven gear 26, where each rotation of the spiral indicator mechanism may equal a predetermined change in a crack pressure setting of the damper system 10. In some instances, the spiral groove 48 may be configured on or integrally formed with driven gear 26 (as shown in FIGS. 12 and 13). Through interacting with the spiral indicator mechanism 46 and/or a radially extending opening 63 in the housing 60, the pressure level indicator arm 51 of the pressure level indicator 50 may engage the spiral groove 48 while being substantially rotationally fixed to travel linearly by opening 63, which may result in radial movement of the pressure level indicator arm 51 in response to rotational movement of the spiral indicator mechanism 46.

In addition, or alternatively, the pressure level indicator arm 51 may have a pivot at one end, a needle or other mechanism configured to engage the spiral grooves 48 of the spiral indicator mechanism 46 at another end, and a body extending there between. Such a configuration may facilitate at least partial radial movement of the pressure level indicator arm, in a manner similar to a needle arm of typical record players, in response to rotational movement of the spiral indicator mechanism 46. In some instances, the pressure level indicator arm 51 may take on other configurations that may facilitate indicating a set crack pressure of the damper system 10.

A handle mechanism of or for use with damper actuator 20 may include certain features already discussed above, along with other features, as desired. For example, the handle mechanism may include the drive gear mechanism 28 in communication with the driven gear 26 of the damper actuator 20; the handle 34 having a first surface (e.g., bottom surface) 36 and a generally opposing second surface (e.g., top surface) 38, as best shown in FIGS. 14-16, configured to rotate the drive gear mechanism 28 about a drive gear rotation axis (e.g., the rotation axis may be a longitudinally extending axis D-D of the drive gear 30); the housing 60 at least partially enclosing the drive gear mechanism 28; and the spring 52 position about the drive gear mechanism 28 and configured to bias the drive gear mechanism 28 toward a first axial or locked position relative to the housing 60 and the reverse stop member 42.

Illustratively, the handle 34 may be a flip over handle. A flip over handle may be a handle that is configured to flip over or hinge about a point or axis. As discussed, the drive gear mechanism 28 may include the drive gear arm 32 extending from the drive gear 30 and configured to engage the handle 34. In some cases, the handle 34 may be configured to flip or hinge about or over the drive gear arm 32 between a first handle position (e.g., a closed position) and a second handle position (e.g., an opened position). The handle 34 may be configured in the first handle position when the first surface 36 of the handle 34 is adjacent the exterior surface 64 of the housing 60, as shown in FIG. 14, and the handle 34 may be configured in the second handle position when the second surface 38 of the handle 34 is adjacent the exterior surface 64 of the housing, as shown in FIGS. 15 and 16. Further, when the handle 34 is in the first or closed position, the handle 34 may be locked in place with a snap fit, pressure fit, or other connection. For example, a handle extension 35 or other portion of handle 34 may have a snap connection or pressure fit connection with one or more walls of the handle opening 65 and/or other portion(s) of the housing 60 to facilitate preventing inadvertent movement of the handle 34. The first position of the handle 34 may allow for storing of the handle 34 in a position that mitigates the likelihood of snagging insulation as it is brought over the damper actuator 20 during installation.

In some instances, in response to movement of the handle 34, the drive gear arm 32 may be configured to effect axial movement of the drive gear 30 along the drive gear rotation axis or longitudinal axis D-D. For example, if a force (arrow F, FIG. 16) (e.g., a light force) is applied to the first surface 36 of the handle 34 in the direction of housing 60 and contact area 66 when the handle 34 is in the second handle position, the handle may use the contact area 66 as a fulcrum or pivot and act on the drive gear mechanism 28 to move the drive gear mechanism 28 up from the first axial or locked position relative to the housing 60, as shown in FIGS. 14 and 15, to a second axial or unlocked elevated position relative to the housing 60, as shown in FIG. 16. Removing the force F from the first side 36 of the handle 34 may cause the spring to move or bias the drive gear mechanism 28 back to the lowered first axial position. Illustratively, the first axial position of the drive gear mechanism 28 is depicted in FIGS. 14 and 15, where the drive gear 30 of the drive gear mechanism 28 is in or near contact with the interior surface 62 of the housing 60 and stop member 42. Further, the second axial position of the drive gear mechanism 28 is depicted in FIG. 16, where a bottom of the drive gear 30 of the drive gear mechanism 28 is positioned above stop member 42, such that drive gear 30 may be disengaged from the reverse stop mechanism 40 and may rotate freely about its axis D-D.

In addition, or alternatively, to the handle 34 being configured to effect axial movement of the drive gear mechanism 28, the handle 34 may be configured to effect rotational movement of the drive gear 30. For example, when the drive gear mechanism 28 is in the unlocked or second axial position, the handle 34 may be rotated about the drive gear longitudinal or rotation axis D-D and that rotation may cause rotational movement of the drive gear arm 32 and the drive gear 30. Such rotational movement of the drive gear 30 by the handle 34 may rotate the driven gear 26 to set the crack pressure for the damper system 10.

In operation, the damper system 10 (e.g., a mechanical, electromechanical, electrical damper system, or other damper system) may be utilized to set a crack pressure (e.g., note, crack pressure may be the minimum amount of pressure within a duct 2 that triggers or actuates movement of the blade 15 within the duct 2) of a bypass duct 2 of an HVAC duct system. The crack pressure may be set by disengaging the drive gear mechanism 28 from the reverse stop mechanism 40 by opening up the flip over handle to an opened or second position and applying a force to the handle in the direction of housing 60 and the contact area 66. Once the drive gear 30 of the drive gear mechanism 28 has been disengaged from the stop member 42 of the reverse stop mechanism 40, the drive gear 30 of the drive gear mechanism 28 may be rotated by rotating the flip over handle 34 while the handle 34 is in the opened position in order to set the crack pressure. Once the crack pressure of the duct 2 (e.g., the bypass duct) has been set, the force applied to the handle may be released and the drive gear mechanism 28 may automatically mechanically lock in place by engaging the drive gear 30 with the reverse stop member 42 due, at least partially, to a bias force of the spring 52. In some cases, once the crack pressure of the duct 2 has been set, the handle 34 may be flipped from the second handle position or opened position to the first handle position or closed position to further lock the drive gear mechanism 28 in its desired position.

Figure 18:
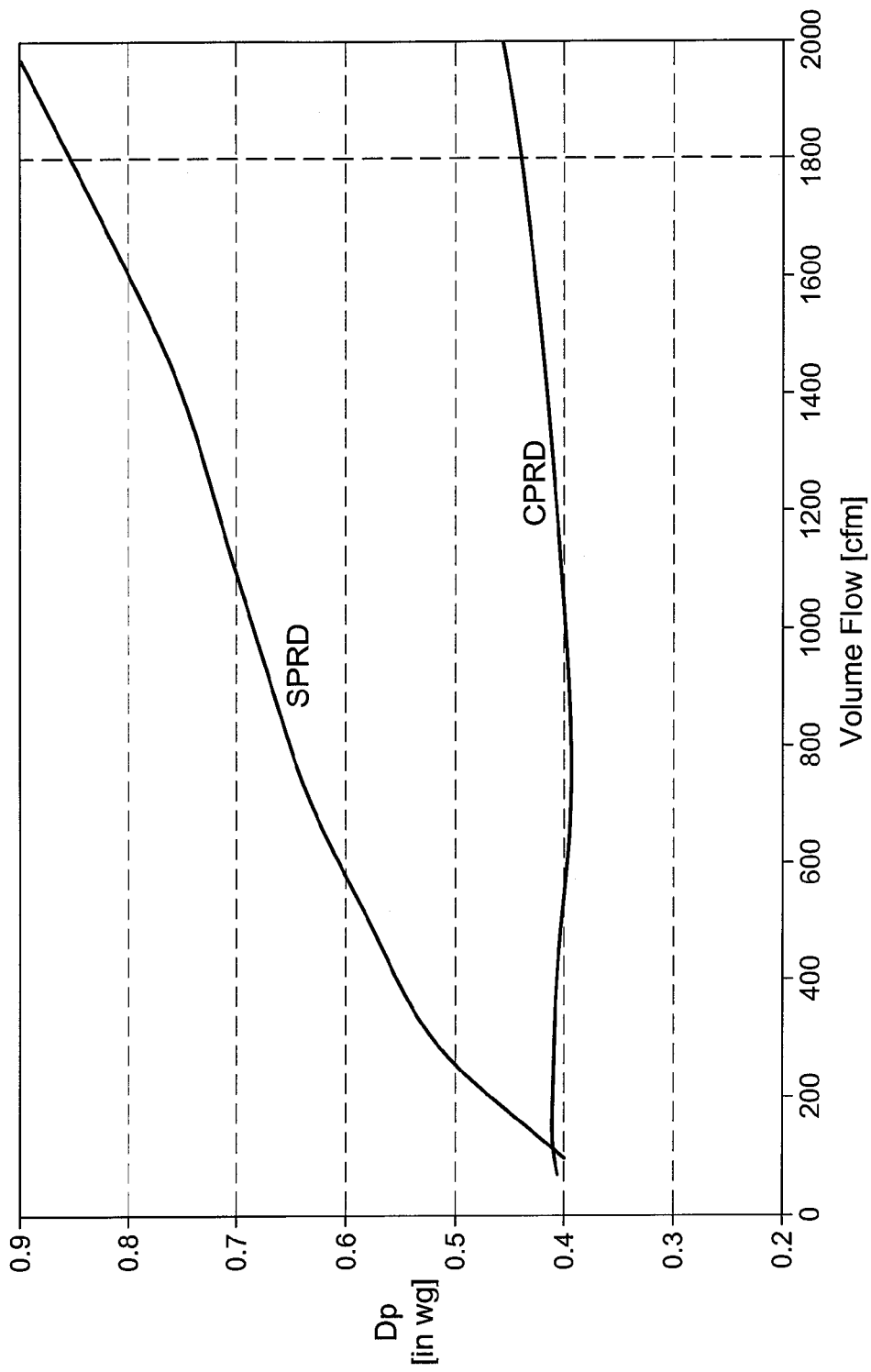
FIG. 18 is a graphical representation of a change in pressure versus a change in volume flow for a CPRD damper compared to a SPRD damper.

The damper system 10 having a mechanical actuator 20 or other actuator may facilitate better control of static pressure rise than in systems with typical static pressure regulating dampers (SPRDs) due, at least partially, to the relatively precise and secure crack pressure adjustment capabilities of the damper system 10. SPRDs typically include a weighted arm to bias the damper in the bypass duct in a particular position and the ability or opportunity to calibrate or adjust the position of the damper is limited. Use of such a damping system may lead to a large increase in pressure (measured in inches of water, "in we") as a bypass flow (measured in cubic feet per minute, "cfm") increases in volume. When pressure increases in HVAC duct systems, the result may be increased harmonic motions and noise levels in the ducts and such noise may be generally undesirable. Also, the load on the blower of the HVAC system may be increased, possibly shortening the life of the equipment. By replacing the weighted arm in an SPRD system with a low stiffness torsion spring 22 to form a constant pressure regulating damper (CPRD) that results in an increased resolution of the desired crack pressure, the pressure rise in the bypass duct due to an increased flow volume can be reduced or lowered with respect to the pressure rise as the volume of flow increases in a bypass duct having a SPRD system, as shown in the graph of FIG. 18. Also, the torsion spring 22 may provide a more linear bias force to the damper blade over the range of movement of the damper blade. This may facilitate keeping the differential pressure across the damper blade 15 in the duct 2 relatively flat (e.g., relatively constant) over a wide range of flow volume (e.g., an operating volume flow rate), as also shown in the graph of FIG. 18.

Typical operating volume flow rates may differ depending on the size or configuration of the duct 2, the damper blade 15, and/or other factors. A relatively flat differential pressure across the damper blade 15 over a wide range of volume flow rate may be generally depicted by a flat curve over an operating volume flow rate for a specific damper system. For example, a curve of a pressure differential across the damper blade 15 over an operating volume flow rate for a specific damper size may be considered flat when a change in differential pressure over the operating volume flow rate range does not exceed one or more particular thresholds (e.g., 0.1 inches of water, 0.2 inches of water, 0.4 inches of water). Example operating volume flow rate ranges include, but are not limited to, ranges of 100 cfm (e.g., a minimum operating volume flow rate) to 2,000 cfm (e.g., a maximum operating volume flow rate), 0 cfm to 2000 cfm, 0 cfm to 5000 cfm and other similar and dissimilar typical operating volume flow rate ranges. In some cases, the minimum or lower operating volume flow rate for a duct 2 or damper system 10 may generally be 0 cfm, 100 cfm, any volume flow rate therebetween, and/or any other volume flow rate less than the maximum or upper operating volume flow rate. The maximum or upper operating volume flow rate for a duct 2 or damper system 10 may be the volume flow rate that results when the average velocity of a fluid flowing through the duct 2 or system 10 is, for example, fifteen feet per second, twenty feet per second, twenty-five feet per second, thirty-five feet per second, forty feet per second, any average velocity in the range of fifteen feet per second to forty-five feet per second, any other average velocity of a fluid flowing through the duct 2 or damper system 10 that results in a volume flow rate greater than the minimum or lower operating volume flow rate.

In some instances, a curve of a pressure differential across the damper blade 15 may be flat if the change in pressure differential across the damper blade 15 over a sub-range of the operating volume flow rate does not exceed a particular threshold. Generally, the particular threshold may be determined so as to provide a damper system 10 causing fewer harmonic motions and lower noise levels than typical SPRD systems. For example, where a duct has an operating volume flow rate range of 100 cfm to 2000 cfm, which may be typical of residential ducts, a curve of the pressure differential across the damper blade 15 may be flat if the change in pressure differential across the damper blade 15 is less than a particular threshold (e.g., 0.1 inches of water, 0.2 inches of water, 0.3 inches of water, 0.4 inches of water) over a sub-range of at least 600 cfm in width (e.g., 0-600 cfm, 500-1100 cfm, 700-1500 cfm, 200-1800 cfm) of the operating volume flow rate range.

In addition to utilizing the torsion spring 22 to set the crack pressure for a bypass duct and thus, lowering the pressure rise in the bypass duct, the design of the damper blade 15 further reduces the pressure rise due to increased responsiveness of the damper blade 15 to an incoming flow. As discussed above, a portion (e.g., an outermost radius of the damper blade 15 or other portion of the damper blade 15) of the damper blade 15 may be tipped, bent, formed, or otherwise configured toward an incoming flow. This configuration of the damper blade 15 results in a damper blade 15 that is more responsive to an incoming flow because the air continues to contact the damper blade 15 at a substantially perpendicular angle as the damper blade 15 is opened.

Further, in some instances where an electrical or electromechanical damper actuator may be utilized instead of a mechanical damper actuator 20, the standoff 70, the clip connector 54, the quick release 58 and other features of the damper system 10 may be utilized to facilitate affecting movement of the damper blade 16 in response to the electrical or electromechanical damper actuator interacting with and/or in communication with the damper shaft 18. When an electrical or electromechanical damper actuator is utilized, the spirit of the disclosure may be realized by substituting at least a portion of the electrical or electromechanical damper actuator for the mechanical actuator 20.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A handle mechanism for use with a damper actuator system having a damper blade configured to be positioned within a duct of a duct system, a shaft in communication with the damper blade, and a driven gear operatively coupled to the shaft, the handle mechanism comprising:
 a drive gear configurable to be operatively coupled to the driven gear and for rotating the driven gear of the damper actuator system;
 a handle configured to rotate the drive gear, the handle has a first surface and an opposing second surface on an opposite side of the handle;
 a housing at least partially enclosing the drive gear, the housing defining an interior surface and an exterior surface; and
 a spring configured to bias the drive gear toward a first axial position relative to the housing; and
wherein:
 the first surface of the handle is configured to be adjacent the exterior surface of the housing when the handle is in a first handle position, and the opposing second surface of the handle is configured to be adjacent the exterior surface of the housing when the handle is in a second handle position; and
 applying a force to the handle toward the housing when the handle is in the second position moves the drive gear against the bias of the spring and in an axial direction from the first axial position toward the handle and to a second axial position relative to the housing along an axis that extends through the drive gear.

2. The handle mechanism of claim 1, wherein removing the applied force to the handle causes the spring to move the drive gear back to the first axial position relative to the housing.

3. The handle mechanism of claim 1, wherein the first axial position of the drive gear relative to the housing corresponds to a locked position at which rotational movement of the drive gear is limited and the second axial position of the drive gear relative to the housing corresponds to an unlocked position at which the drive gear is free from the limit on rotational movement.

4. The handle mechanism of claim 1, wherein:
 the drive gear includes a drive gear arm, the drive gear arm is configured to extend through the housing;
 the housing includes a contact area at least partially about the drive gear arm; and
 the handle abuts the contact area when the handle is in the second handle position.

5. The handle mechanism of claim 4, wherein the handle is pivotally connected to the drive gear arm and is configured to rotate with the drive gear arm.

6. The handle mechanism of claim 4, wherein:
 the spring has a first end and a second end;
 the first end of the spring abuts the drive gear; and
 the second end of the spring abuts the interior surface of the housing.

7. The handle mechanism of claim 1, further comprising:
 a reverse stop configured to engage the drive gear when the drive gear is in the first axial position relative to the housing.

8. The handle mechanism of claim 7, wherein the drive gear is configured to be disengaged from the reverse stop when the drive gear is in the second axial position relative to the housing.

9. The handle mechanism of claim 7, wherein the reverse stop includes a stop member that extends from an interior surface of the housing.

10. A handle mechanism for actuating a driven gear of a damper within a duct, the handle mechanism comprising:
 a drive gear in communication with the driven gear of the damper, the drive gear having a first end and a second end opposite the first end;
 a housing at least partially enclosing the drive gear;
 a handle for use in rotating the drive gear about a rotation axis;
 a drive gear arm extending from the first end of the drive gear to engage the handle;
 a reverse stop configured to engage the drive gear adjacent the second end thereof when the drive gear is in a locked position at which rotational movement of the drive gear about a rotation axis is limited;
 wherein the drive gear is configured to move from the locked position in an axial direction along the rotation axis of the drive gear to an unlocked position in response to applying a force to the handle; and
 wherein the drive gear is free from the limit on rotational movement when in the unlocked position and rotation of the handle is free to rotate the drive gear about the rotation axis.

11. The handle mechanism of claim 10, wherein the drive gear arm is configured to effect axial movement of the drive gear along the rotation axis of the drive gear in response to movement of the handle toward the housing.

12. The handle mechanism of claim 11, wherein
 the handle is a flip over handle that can be flipped about the drive gear arm between a first position and a second position; and
 when a force is applied to the flip over handle in the second position, the drive gear arm effects movement of the drive gear in the axial direction toward the unlocked position, where the drive gear in the unlocked position is disengaged from the reverse stop.

13. The handle mechanism of claim 12, wherein when the handle is in the second position and is rotated, the drive gear arm effects rotational movement of the drive gear.

14. The handle mechanism of claim 10, wherein the drive gear is biased toward the locked position by a spring.

15. A method of setting a crack pressure of a bypass duct through the use of a mechanical damper actuating system including a drive gear, a reverse stop configured to selectively engage the drive gear, a flip over handle in communication with the drive gear, and a housing configured to at least partially enclose the drive gear and the reverse stop, the method comprising:
 moving the drive gear away from the reverse stop when pivoting the flip over handle about an axis to an open position and applying a force to the flip over handle in a direction toward the housing to axially move the drive gear along a rotation axis and away from the reverse stop to disengage the drive gear from the reverse stop, the rotation axis being substantially perpendicular to the axis about which the flip over handle is pivoted; and
 rotating the flip over handle while in the open position to rotate the drive gear about the rotation axis to set the crack pressure of the bypass duct.

16. The method of claim 15, wherein disengaging the drive gear from the reverse stop comprises:
 applying a force to the flip over handle toward the housing while in the open position.

17. The method of claim 15, further comprising:
engaging the drive gear with the reverse stop by flipping the flip over handle to a closed position.

* * * * *